US009489625B2

(12) United States Patent
Kalns et al.

(10) Patent No.: US 9,489,625 B2
(45) Date of Patent: *Nov. 8, 2016

(54) RAPID DEVELOPMENT OF VIRTUAL PERSONAL ASSISTANT APPLICATIONS

(71) Applicant: SRI International, Menlo Park, CA (US)

(72) Inventors: Edgar T. Kalns, San Jose, CA (US); Dayne B. Freitag, La Mesa, CA (US); William S. Mark, San Mateo, CA (US); Necip Fazil Ayan, Palo Alto, CA (US); Michael J. Wolverton, Mountain View, CA (US); Thomas J. Lee, San Francisco, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 292 days.

This patent is subject to a terminal disclaimer.

(21) Appl. No.: 13/891,864

(22) Filed: May 10, 2013

(65) Prior Publication Data

US 2014/0337266 A1    Nov. 13, 2014

(51) Int. Cl.
*G06N 5/02*    (2006.01)
(52) U.S. Cl.
CPC ....................... *G06N 5/02* (2013.01)
(58) Field of Classification Search
CPC ........................................................ G06N 5/04
USPC ........................................................... 706/46
See application file for complete search history.

(56) References Cited

U.S. PATENT DOCUMENTS

| 2003/0046201 A1 | 3/2003 | Cheyer |
| 2007/0100790 A1 | 5/2007 | Cheyer et al. |
| 2009/0164441 A1 | 6/2009 | Cheyer |
| 2012/0016678 A1 | 1/2012 | Gruber |

(Continued)

FOREIGN PATENT DOCUMENTS

WO    WO2011028844 A2    3/2011

OTHER PUBLICATIONS

Garcia-Serrano et al ("Using AI techniques to support advanced interaction capabilities in a virtual assistant for e-commerce" 2004).*

(Continued)

*Primary Examiner* — Lut Wong
(74) *Attorney, Agent, or Firm* — Barnes & Thornburg LLP

(57) ABSTRACT

A platform for developing a virtual personal assistant ("VPA") application includes an ontology that defines a computerized structure for representing knowledge relating to one or more domains. A domain may refer to a category of information and/or activities in relation to which the VPA application may engage in a conversational natural language dialog with a computing device user. Re-usable VPA components may be linked to or included in the ontology. An ontology populating agent may at least partially automate the process of populating the ontology with domain-specific information. The re-usable VPA components may be linked with the domain-specific information through the ontology. A VPA application created with the platform may include domain-adapted re-usable VPA components that may be called upon by an executable VPA engine to determine a likely intended meaning of conversational natural language input of the user and/or initiate an appropriate system response to the input.

20 Claims, 11 Drawing Sheets

(56) References Cited

U.S. PATENT DOCUMENTS

2012/0245944 A1  9/2012  Gruber et al.
2013/0152092 A1  6/2013  Yadgar

OTHER PUBLICATIONS

"Nuance's Nina is both more and less than Siri", available at http://www.meisel-on-mobile.com/2012/08/06/nuances-nina-is-both-more-and-less-than-siri/, 1 page.

Nitz et al., U.S. Appl. No. 13/585,003, "Method, System, and Device for Inferring a Mobile User's Context and Protectively Providing Assistance", filed Apr. 14, 2012.

Nitz et al., U.S. Appl. No. 13/585,008, "Method, System, and Device for Inferring a Mobile User's Context and Protectively Providing Assistance", filed Apr. 14, 2012.

Wolverton et al., U.S. Appl. No. 13/678,209, "Vehicle Personal Assistant", filed Nov. 15, 2012.

Wolverton et al., U.S. Appl. No. 13/678,213, "Vehicle Personal Assistant", filed Nov. 15, 2012.

Judith Aquino, "Siri-ous Influence: Enterprise virtual Assistants Have Arrived", Speech Technology Magazine, Nov./Dec. 2012, pp. 13-16.

"Angel Unveils a More Personalized Customer Experience with Introduction of Lexee from Angel Labs", available at http://www.angel.com/docs/press-releases/Angel_Unveils_More_Personalized_Customer_Experience_Lexee_Angel_Labs_2012_08-13.pdf, 3 pages.

"Interactive product brochure :: Nina: The virtual Assistant for Mobile Customer Services Apps", Nuance communications, Inc., 11 pages.

Banko et al., "Open Information Extraction from the Web", Department of computing Science and Engineering, University of Washington, Seattle, WA, 7 pages.

Freitag, Dayne, et al., "Finding the What and the How Toward Automated Model Construction from Text", Final Technical Report on HNC Software's Project on Relationship Extraction and Link Induction for Simulation and Modeling (REALISM), under IARPA's program on Proactive Intelligence (PAINT); Jan. 2009.

\* cited by examiner

RAPID DEVELOPMENT OF VIRTUAL PERSONAL ASSISTANT APPLICATIONS

BACKGROUND

Computerized systems commonly known as virtual personal assistants ("VPAs") can interact with computing device users in a conversational manner. To do this, the VPA needs to be able to correctly interpret conversational user input, execute a task on the user's behalf, determine an appropriate response to the input, and present the response in a way that the user can readily understand and appreciate as being responsive to the input. A complex assortment of software components work together to accomplish these functions. Further, even very application-specific VPAs typically need to access and reason over a large amount of knowledge. Such knowledge includes information about those aspects of the world that the computing device user may wish to discuss with the VPA, the manner in which humans normally talk about those aspects of the world, and the applicable cultural norms, activities, and human behaviors. As a result, developing a VPA application traditionally has been an arduous task.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
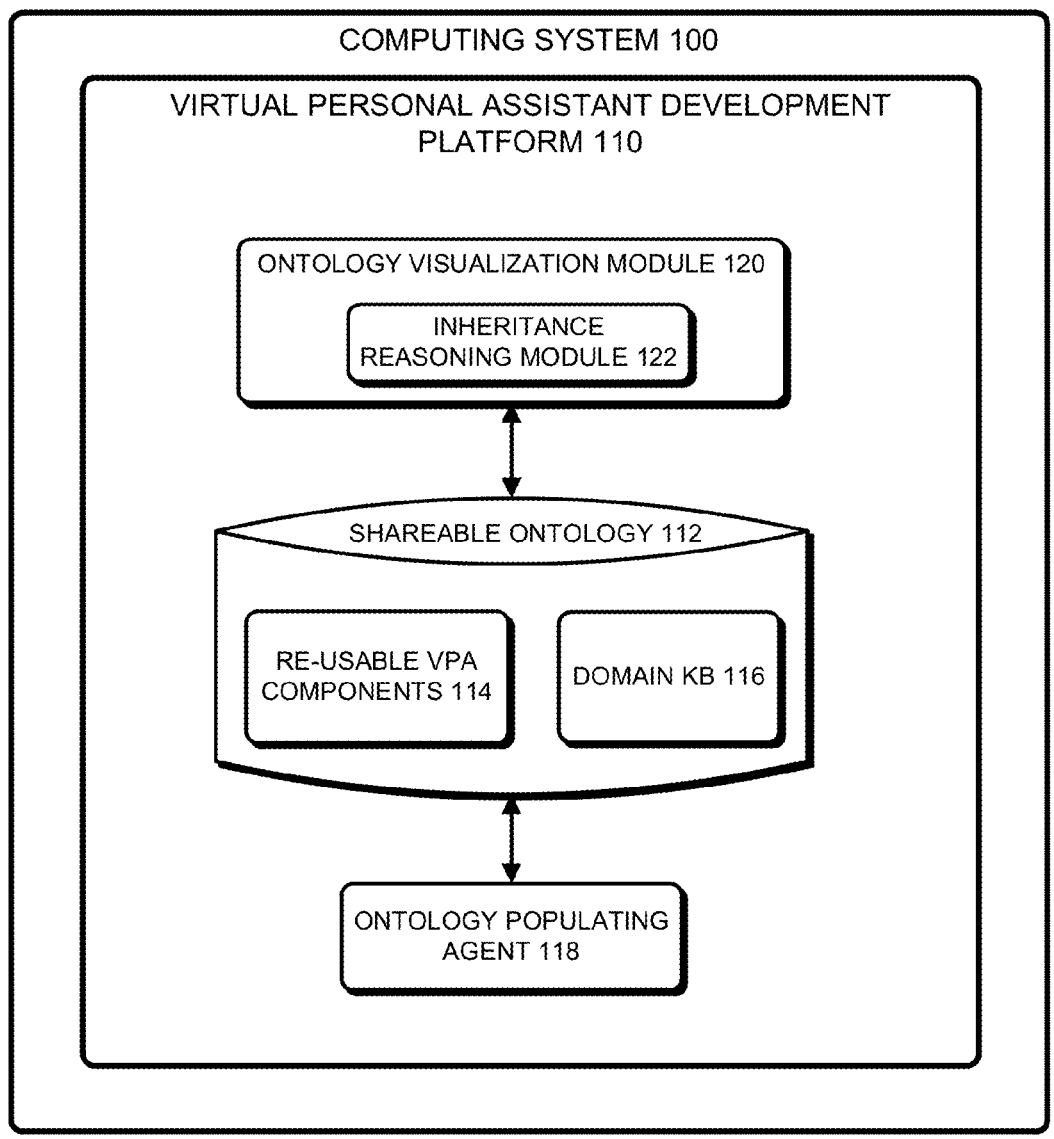
FIG. 1 is a simplified module diagram of at least one embodiment of a virtual personal assistant ("VPA") development platform embodied in a computing system as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Figure 2:
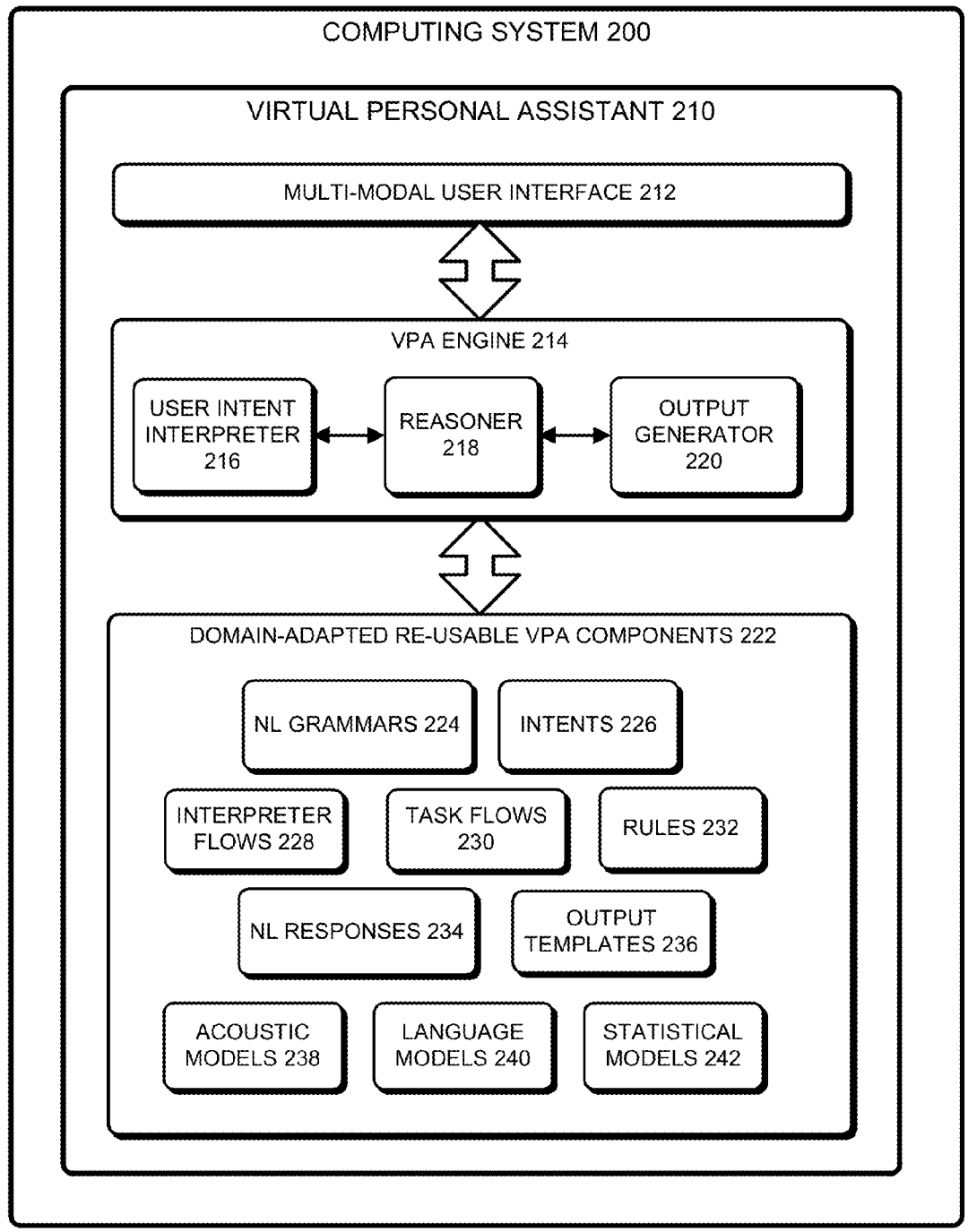
FIG. 2 is a simplified module diagram of at least one embodiment of a VPA application that may created using the platform of FIG. 1, embodied in a computing system.

As disclosed herein, the creation of natural language ("NL") dialog computer applications using virtual personal assistant ("VPA") technology can be facilitated with the use of an ontology. The ontology may be tailored to the particular needs of VPA applications (as opposed to other types of interactive software applications), in at least some respects. As shown in FIG. 2, described below, a VPA application can be "modularized" in the sense that certain core functional components, which may be referred to herein collectively as the "VPA engine," can be separated from other components that "feed" the VPA engine. Such other components supply the VPA engine with the information and logic it needs to determine a computing device user's intended goal or objective in using the VPA, or to locate and retrieve pertinent information, provide a service, or initiate or execute some other action with the computing device, all the while interacting with the user in a more or less human-like, conversational manner. The ontology may be designed to facilitate the selection, development and/or configuring of these "feeder" components of the VPA application as needed to achieve the desired VPA functionality for a particular domain or domains.

In some cases, the ontology may be defined at a general level, e.g., as a shared or "shareable" ontology that can be used to develop VPA applications for multiple different domains. With the tools and techniques described herein, the shareable ontology can be adapted to a specific domain using knowledge that is readily available, such as data that is posted on Internet web pages. Such knowledge can be extracted from web pages or other data sources, and linked with the ontology in an automated way, as described below. Moreover, as disclosed herein, the ontology can be used to automate the selection and instantiation of general-purpose or "default" VPA "feeder" components, such as NL dialogs and task flows, in a form that is appropriate for a specific domain. In these and other ways, the development and maintenance of VPA applications can be simplified and accelerated.

Referring now to FIG. 1, an embodiment of a VPA development platform 110 that can be used to more rapidly create, support, and/or maintain VPA applications includes a shareable ontology 112, a number of re-usable VPA components 114, a domain knowledge base 116, an ontology populating agent 118, an ontology visualization module 120, and an inheritance reasoning module 122. The VPA development platform 110 and its various components are embodied as computer software, firmware, and/or hardware in a computing system 100. The computing system 100 may include one or multiple computing devices as described more fully below with reference to FIG. 11.

The ontology 112 is embodied as a computerized knowledge representation framework. The illustrative shareable ontology 112 is embodied as a "general-purpose" or "shared" ontology that can be used to develop VPA applications for one domain or for many different domains. That is, the shareable ontology 112 defines a computerized structure for representing knowledge that relates to one domain or multiple domains. Such a structure includes ontological concepts (or "objects"), properties (or "attributes") that are associated with the concepts, and data relationships between or among the ontological concepts and properties. For example, in an ontology for a general-purpose "retail" domain, "product" may be an ontological concept, "color," "description," and "size" might be properties of the "product" concept, "has-a" might be a type of data relationship that exists between each of those properties and the "product" concept, and "is-a" might be a type of data relationship that exists between the concept "product" and a sub-concept "shirts." That is, in the illustrative retail domain, a shirt is type of product that has a color, description, and size.

As discussed further below with reference to FIGS. 6-8, some embodiments of the ontology 112 are hierarchical, in that the ontology 112 leverages the "natural" inheritance structure of knowledge about a particular part of the real world. A hierarchical ontology can enable data and/or VPA components to be shared and re-used through inheritance. In some embodiments, the VPA development platform may include an inheritance reasoning module 122, described below.

As used herein, the term "domain" may refer to a category of information and/or activities in relation to which a VPA application may engage in a conversational natural language dialog with a computing device user. In some cases, "domain" may refer to the scope of a particular VPA application or a portion thereof. As such, a domain may correspond to one or more ontological concepts and/or properties that are defined in the ontology 112. For example, a VPA application may be directed specifically to e-commerce shopping for "oil filters" (a single domain or concept) while another VPA application may be more broadly directed to "automotive supplies" (a broader category of items that may include oil filters, spark plugs, and other supplies). Embodiments of the ontology 112 may be created, updated, and maintained using a knowledge representation language, such as OWL (Web Ontology Language) and/or an ontology-authoring mechanism such as RDF (Resource Development Framework).

The ontology 112 is designed for use in connection with the development of VPA applications. As such, the ontology 112 represents knowledge in a way that is helpful and useful to the various components of a VPA application. To do this, data relationships are established between the elements of the ontology 112 and the re-usable VPA components 114. More specifically, the re-usable VPA components 114 are included in or link to the ontology 112, as discussed in more detail below. Further, the ontology 112 may define certain ontological concepts and properties, and relationships between the concepts and properties, so as to model a way in which humans are likely to talk about them with the VPA application. Alternatively or in addition, the ontology 112 may define certain ontological concepts, properties, and relationships in a way that that is likely to coincide with the way that information is encountered by the ontology populating agent 118, described below.

As another example, the ontology 112 may define an inheritance relationship between an ontological concept of "jeans" and a "pants" concept because many, if not all, of the properties of pants are also applicable to jeans. As such, during the development of a VPA application designed for e-commerce shopping for pants, the platform 110 may use the ontology 112 to help the developer create a natural language ("NL") response that relates to pants. Through the ontology 112, the platform 110 may know that pants have an "inseam" and that the inseam is a measurement that is used to determine a person's pants size. Accordingly, the platform 110 may suggest or otherwise help the VPA developer create an NL response such as "please tell me your inseam measurement," and incorporate that NL response into the VPA application for pants shopping. Further, since the platform 110 knows through the ontology 112 that jeans are a type of pants, the platform 110 may suggest or otherwise help the application developer link the already-created NL response, "please tell me your inseam measurement" with the concept of "jeans." The platform 110 may "remember" the link between the "inseam" NL response and the concept of jeans (through the ontology 112), so that later, if a VPA application is developed specifically for e-commerce shopping for jeans, the platform 110 can suggest or otherwise help the VPA developer incorporate the "inseam" NL response into the jeans-specific e-commerce VPA application.

In addition to defining data relationships between different ontological concepts and properties, the ontology 112 defines relationships or "links" between the ontological concepts and properties and the re-usable VPA components 114. That is, the re-usable VPA components 114 are programmatically linked with one or more of the ontological concepts and/or properties in the ontology 112. In this way, the ontology 112 can be used to automate or at least partially automate the selection of re-usable VPA components 114 for use in a VPA application for a particular domain of interest and to instantiate those selected components for the domain of interest.

As used herein, terms such as "relation," "data relationship," "linkage," and "link" may refer to a logical association or semantic relationship that may be implemented in software using specialized computer programming statements or constructs. For example, in artificial intelligence-based systems, such statements may be referred to as sentences or axioms (e.g., "pants is-a apparel", "tool is-a retail product"). Other forms of linking mechanisms, such as pointers, keys, references, and/or others may also be used to establish logical associations or semantic relationships between elements of the ontology 112 or between the ontology 112 and the re-usable components 114. In some embodiments, the re-usable VPA components 114 may be included in the ontology 112. For example, the ontology 112 may be viewed as the "union" of the re-usable VPA components 114 and the domain knowledge base 116, where the re-usable VPA components 114 include a number of different sub-components as illustrated in FIG. 2. In some embodiments, the re-usable VPA components 114 and/or portions of the domain knowledge base 116 may be stored in the same container or containers as the ontology 112 or portions thereof (where "container" refers generally to a type of computerized data storage mechanism). For example, a VPA component 114 that is an NL grammar related to pants (e.g., "I like the natural-fit capris") may be linked with or included in the container that corresponds to the "pants" concept of the domain knowledge base 116 through the ontology 112. In other embodiments, the re-usable components 114 are linked with the domain knowledge base 116 through the ontology 112 using, for example, one of the programming mechanisms above (without concern as to where those components 114 may be stored).

The re-usable VPA components 114 include software components, such as data, logic, alphanumeric text elements, sentences or phrases, variables, parameters, arguments, function calls, routines or procedures, and/or other components, which are used by the VPA application to conduct an NL dialog with a computing device user and/or initiate or execute a task or activity for the user based on the VPA's understanding of the NL dialog. At a high level, the re-usable VPA components 114 may be categorized as follows: those that assist the VPA application in understanding the user's intended meaning, goal, or objective of his or her NL dialog input, those that help the VPA application reason about the user's intended meaning, goal, or objective and determine an appropriate system response, and those that generate for the VPA application output formulated in a suitable fashion given the user's intent as previously determined by the VPA application.

Traditionally, many of these types of VPA components have been created individually by hand (meaning, manual creation using a computing device). As disclosed herein, the VPA components 114 are "re-usable" in that they are initially defined and created for a general purpose and then "instantiated" for a given domain with the help of the ontology 112, the ontology populating agent 118, and, in some embodiments, the inheritance reasoning module 122. As mentioned above and shown in FIG. 2, the components 114 can be considered "feeder" components that service the core functional components of the VPA application rather than being a part of the core functionality itself. In this way, both the core functionality or "VPA engine" and the feeder components 114 can be separated from the domain-specific knowledge that is needed to create a VPA application for a particular domain. That is to say that some embodiments of the platform 110 at least initially provide "domain-independent," "generic," or "default" versions of the re-usable VPA components 114 that can be adapted or customized for domain-specific VPA applications. It should be noted however, that terminology such as "general-purpose," "domain-independent," "generic," "default," or, on the flip side, "domain-specific" or "domain-dependent," as used herein, may each refer to any level of abstraction. For example, in some contexts, "e-commerce" may be considered a "general-purpose" ontological concept or domain while in other contexts, sub-concepts such as "apparel," or even "pants" may be considered "general-purpose," and even more specific concepts (e.g., "jeans," "dresses," etc.) may be considered "domain-specific" or "domain-dependent." As such, the term "re-usable" does not necessarily imply that a particular VPA component 114 cannot be domain-specific. In other words, a VPA component 114 can be "re-usable" even if it is "domain-specific." For instance, as noted above, a VPA component 114 that relates to "pants" may be considered generic if the VPA application is specifically directed to "women's pants" but may be considered domain-specific if the VPA application is more broadly directed to all types of apparel. In either case, the VPA component 114 may be re-used in the sense that it may be adapted for use in a more general domain or a more specific domain, or adapted for use in another domain entirely, depending on the structure of the ontology 112.

The domain knowledge base 116 or "domain ontology" is included in or linked with the overall ontology structure 112 or portions thereof so as to guide the linkages/relationships between or among the re-usable VPA components 114. That is, data objects and attributes that are defined in the domain knowledge base 116 correspond to concepts, properties, and data relationships of the ontology 112, so that re-usable components 114 that are linked with the ontology 112 can be adapted to the domain (e.g., by replacing parameters with actual domain-specific data values). The illustrative domain knowledge base 116 is embodied as a data structure or structures (e.g. database(s), table(s), data files, etc.) in which data records and data values corresponding to the various elements of the ontology 112 may be stored. Once populated (e.g., by the ontology populating agent 118), the domain knowledge base 116 may be referred to as a "populated" ontology or a domain-specific "leaf," "node," or "instance" of the ontology 112 (keeping in mind that "domain-specific" may refer to any level of abstraction that may be needed by a particular VPA application, as discussed above).

As an example, in developing a VPA application for an e-commerce vendor that sells jeans, an embodiment of the ontology 112 may be defined to include "jeans" as an ontological concept having properties of style, color, size, and care instructions. A corresponding embodiment of the domain knowledge base 116 may have stored therein individual data records that each include data values for each style of jeans sold by the e-commerce vendor, the colors and sizes in which each style is available, and the care instructions applicable to each style of jeans. A populated version of the domain knowledge base 116 may contain data values such as "boot cut" and "slim," which map to a "style" property of a "jeans" concept in the ontology. In this example, "style" may be considered a "common characteristic" that links the data values in the domain knowledge base 116 with the ontology.

The domain knowledge base 116 can be instantiated or populated with data values in a number of different ways, including manual data entry, interfacing with the vendor's back-end systems (e.g., via an application programming interface or API), or with the help of the ontology populating agent 118. Once populated with data values, the domain knowledge base 116 can be used to instantiate new or customized versions of the re-usable VPA components 114. This can be done by virtue of the linkages between the re-usable VPA components 114 and the ontology 112, and the linkages between the elements of the domain knowledge base 116 and the ontology 112. Such linkages are established based on characteristics that these elements have in common with each other, as described further below with reference to FIGS. 3 and 4.

The illustrative ontology populating agent 118 is embodied as a computerized sub-system or module (e.g., software, firmware, hardware, or a combination thereof) that mines, "scrapes" or otherwise obtains data from Internet web pages (or other electronic data sources to which the agent 118 has access), maps the scraped data to the structure of the ontology 112, and populates the domain knowledge base 116. The ontology populating agent 118 may be used to develop VPA applications that support transactional web sites, including web pages or web sites that support electronic transactions with computing device users that relate to a domain of interest or to items in a domain (e.g., e-commerce transactions, financial transactions, healthcare-related transactions, and/or others). The ontology populating agent 118 may be used to harvest, from the relevant web page or pages, the applicable domain-specific information that needs to be applied to or incorporated into the re-usable VPA components 114 for a particular application. In some cases, other types of publicly-available electronic data sources may be mined by the ontology populating agent 118 to bolster the depth and/or breadth of knowledge that can be "fed" to a particular VPA application. For instance, competitor web pages or web sites, publicly available product review pages, publicly available dictionaries and knowledge bases (e.g., DICTIONARY.COM, WIKIPEDIA, and/or others), public areas of social media sites (e.g., FACEBOOK, GOOGLE+, etc.), publicly available blogs, and/or other data sources may be mined to provide additional information for use by the VPA application. Such information may include alternative names, nicknames, synonyms, abbreviations, and the like, as well as current context information (e.g., in the e-commerce domain, information about competitor products, or items or styles of products that are currently popular or appear to be a frequent topic of conversation). The operation of the ontology populating agent 118 is described in more detail below with reference to FIGS. 3-5.

The ontology visualization module 120 is embodied as a computerized sub-system or module (e.g., software, firmware, hardware, or a combination thereof) that presents an interactive representation of the ontology 112 and/or the re-usable VPA components 114 to a computing device user, such as a VPA application developer or knowledge base engineer, for the purpose of developing a VPA application. The ontology visualization module 120 allows the developer to navigate and explore the ontology 112, visually. In some embodiments, the visualization module 120 presents a graphical representation of the ontology 112 similar to the illustrative depictions shown in FIGS. 6-8. Such a visualization may be simple enough for an end user or another person without sophisticated computer programming skills to understand and use. In any case, the ontology visualization module 120 permits the developer or other user to assign concepts and properties to the various elements and levels of the ontology 112 and thereby define relationships between the concepts and properties. The ontology visualization module 120 may do so by, for example, allowing the user to "drag and drop" graphical representations of the ontological concepts and properties from one element or level of the ontology 112 to another using, e.g., a computer mouse, stylus, or one's finger.

Figure 10:
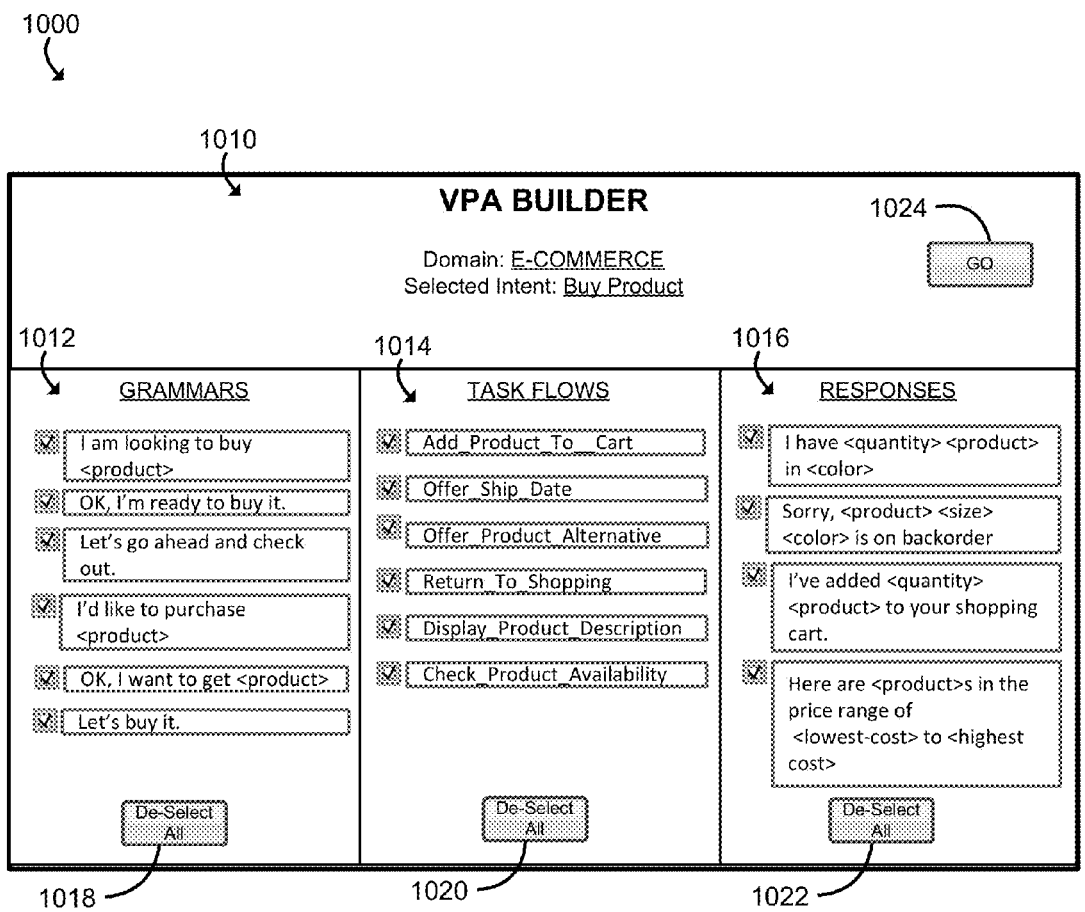
FIG. 10 is a simplified illustration of at least one embodiment of a graphical user interface for the platform of FIG. 1.

The illustrative ontology visualization module 120 allows the developer or other user to associate the re-usable VPA components 114 with the ontology 112 in a similar manner. For example, as indicated by FIGS. 6-8, the links between VPA components 114 and their corresponding ontological concepts can be presented graphically on a display screen of the computing system 100, and the ontology visualization module 120 may allow such links to be added or changed by "pointing and clicking," "dragging and dropping," or other mode of user input. FIG. 10, described below, illustrates a simplified example of a display screen that may be presented to a computing device user to enable the selection of re-usable VPA components 114 for inclusion in a VPA application.

In some embodiments, the ontology visualization module 120 includes an inheritance reasoning module 122. The illustrative inheritance reasoning module 122 leverages the organizational structure of the ontology 112 to programmatically explore and follow data relationships and linkages as needed for the development of a VPA application. To do this, the inheritance reasoning module 122 analyzes the existing programmatic statements (e.g., sentences and/or axioms) that define the data relationships between the concepts and properties in the ontology 112. Such statements may indicate, for example, subsumption relationships in which concepts that are defined as sub-classes or sub-categories of other concepts in the ontology 112 inherit all of the properties and relations of their respective parent concepts (e.g., a "child" concept is "subsumed" by its parent).

In many cases, (e.g., where straightforward hierarchical relationships are involved) no reasoning algorithms are needed by the inheritance reasoning module 122, or the inheritance reasoning module 122 may be omitted. Where the ontology 112 includes other kinds of relationships (e.g., temporal), however, the inheritance reasoning module 122 may apply one or more automated reasoning algorithms to reason over a populated domain knowledge base 116 to infer new data relationships and/or linkages based on the existing data relationships and/or linkages that are contained in the ontology 112. That is, the inheritance reasoning module 122 may observe that a particular combination of data relationships and/or linkages exists in the ontology 112 and based on that observation, add the reasoned-about relationships to the ontology 112. Following that, the ontology visualization module 120 may make a suggestion or recommendation to the VPA application developer as to a data relationship or linkage that may be appropriate for a new domain or a new piece of data.

As an example, if the VPA developer is designing a new VPA application for jeans shopping, the developer is using a "general-purpose" e-commerce ontology that defines "apparel" as a sub-class or sub-category of a "purchasable item" concept, and the developer informs the platform 110 that "jeans" are a type of apparel (or the platform 110 learns that relationship in an automated fashion, as described below), the inheritance reasoning module 122 may suggest to the developer that all or a portion of the re-usable VPA components 114 that are linked with the "apparel" concept in the ontology be included in the new VPA application for jeans. In some cases, the module 122 or perhaps some other mechanism of the ontology visualization module 120, or the platform 110 more generally, may simply proceed to establish the new linkage in an automated fashion without requiring input from the user. In those cases, the ontology visualization module 120 may present a depiction of the new relationship on a display of the computing system 100, for example, to let the developer know that the new relationship has been created and/or to allow the developer an opportunity to undo or modify the relationship.

As another example, referring to FIG. 10, if the VPA developer is developing a new VPA application for a specific domain of e-commerce (e.g., jeans), and the developer selects a re-usable component 114 that is an intent 226 called "buy product," the inheritance reasoning module 122 may infer that the other VPA components 114 that are associated with the "product" concept in the ontology 112 are also likely to be applicable to jeans, and also those associated with any "parent" concepts of the product concept (e.g., "retailer," etc.) that are defined in the ontology 112. As such, the inheritance reasoning module 122 may suggest to the developer all of the other re-usable components 114 that are linked with the "buy product" intent (through the "product" concept of the ontology) for inclusion in the new VPA application. In this way, the inheritance reasoning module 122 can help automate the selection and instantiation of VPA components for particular domains, so that there is no need for the VPA developer to create new components 114, or create new versions of the components 114, by hand.

Referring now to FIG. 2, a simplified depiction of functional components of an embodiment of a VPA application 210, which can be constructed with the use of the VPA development platform 110, is shown. The VPA application 210 is embodied in a computing system 200. The computing system 200 typically includes a mobile device, such as a smart phone, tablet computer, e-reader, or body-mounted device (e.g., goggles, wrist watch, or bracelet), but may include other types of computing devices or combinations of devices as described more fully below with reference to FIG. 11.

The illustrative VPA 210 includes a multi-modal user interface 212, a VPA engine 214, and a number of domain-adapted re-usable components 222. Some examples of VPA applications including multi-modal user interfaces and VPA engine components are described in other patent applications of SRI International, for example, Tur et al., PCT International Application Publication No. WO 2011/028833, entitled "Method and Apparatus for Tailoring Output of an Intelligent Automated Assistant to a User," Yadgar et al., U.S. patent application Ser. No. 13/314,965, filed Dec. 18, 2011, entitled "Generic Virtual Personal Assistant," Nitz et al., U.S. patent application Ser. Nos. 13/585,003 and 13/585,008, filed Aug. 14, 2012, both entitled "Method, System, and Device for Inferring a Mobile User's Context and Proactively Providing Assistance," and Wolverton et al., U.S. patent application Ser. Nos. 13/678,209 and 13/678,213, filed Nov. 15, 2012, both entitled "Vehicle Personal Assistant." A brief overview of the functionality of the user interface 212 and the VPA engine 214 follows. As disclosed herein, in operation, the VPA engine 214 is in bidirectional communication with both the user interface 212 and the re-usable VPA components 222, as shown, by one or more communication links such as any of those described herein. In contrast to conventional VPA applications, the VPA 210 is constructed with the domain-adapted re-usable components 222, as described herein.

Figure 11:
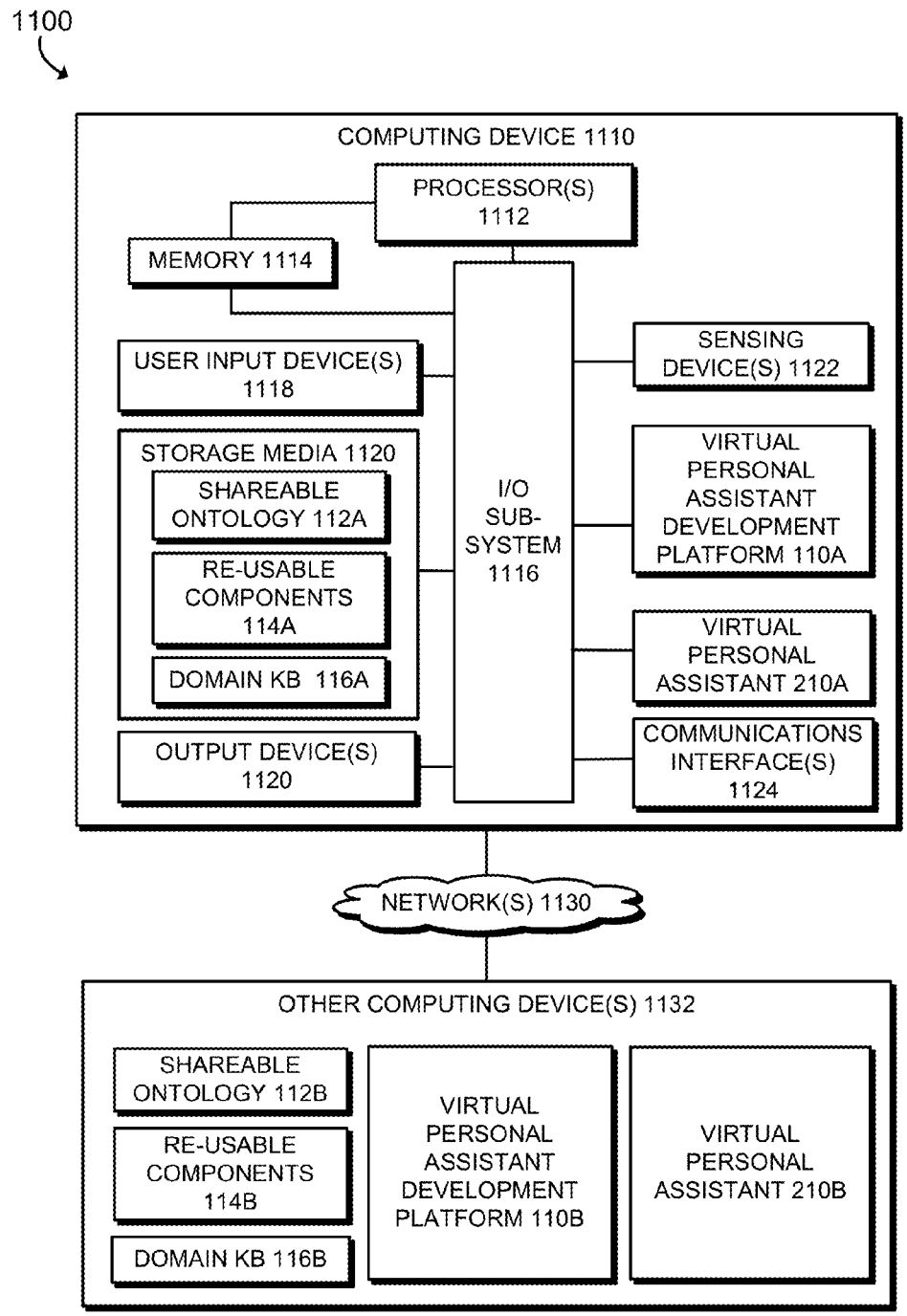
FIG. 11 is a simplified block diagram of at least one embodiment of a hardware environment for the platform of FIG. 1 and/or the VPA application of FIG. 2.

Each of the components 212, 214, 222 and their respective subcomponents shown in FIG. 2 are embodied as computerized sub-systems, modules, and/or data structures (e.g., software, firmware, hardware, or a combination thereof) that are accessible to and in some cases, executable by, a central processing unit (e.g., a controller or processor, such as the processor 1112 of FIG. 11).

The illustrative multi-modal user interface 212 captures conversational natural language ("NL") input of a computing device user, as well as other forms of user input. In some embodiments, the interface 212 captures the user's spoken natural language dialog input with a microphone or other audio input device of the computing system 200. Alternatively or in addition, the interface 212 captures text-based natural language dialog input by, for example, a touch pad, key pad, or touch screen of the computing system 200. Other (e.g., non-NL dialog) user inputs also may be captured by a touch pad, key pad, touch screen, or other input device, through the user interface 212. Such inputs may include, for example, mouse clicks, taps, swipes, pinches, and/or others. In some cases, the interface 212 may capture "off-device" body movements or other gesture-type inputs (such as hand waves, head nods, eye movements, etc.) by, e.g., a camera, motion sensor and/or kinetic sensor, which may be integrated with or otherwise in communication with the computing system 200. In any event, the captured user inputs are at least temporarily stored in memory of the computing system 200. While the VPA 210 is often mainly concerned with processing the NL dialog inputs, any or all of the other forms of user inputs may be used by the VPA 210 to aid in its understanding of the NL dialog inputs, to determine a suitable response to the NL dialog inputs, or for other reasons.

While in many cases the conversational NL dialog that occurs between the computing device user and the computing system 200 is initiated by user input, this need not be the case. In some embodiments, the VPA 210 may operate in a proactive manner to initiate a natural language dialog with the user in response to the user's inputs (e.g., non-NL inputs) or sensed information obtained or derived from, for example, location-based systems (e.g., global positioning systems or GPS, cellular systems, and/or others). Thus, the user inputs, including the user-generated NL dialog inputs, can include natural language in a dialog initiated by the user and/or the user's natural language responses to system-generated output. For example, the natural language dialog inputs may include questions, requests, statements made by the user to begin an information-seeking dialog, commands issued by the user to cause the system 200 to initiate or undertake some action, responses to system-executed actions, and/or responses to questions presented by the system 200. A portion of the user interface 212 may convert the human natural language dialog inputs into machine-readable versions thereof, or this may be done by a component of the VPA engine 214, described below. As noted above, the NL dialog inputs captured and processed by the user interface 212 may be in the form of audio, text, some other natural language inputs, or a combination thereof.

The multi-modal user interface 212 is in bidirectional communication with the VPA engine 214 by one or more electronic signal paths (e.g., a bus, a network connection, or other type of wired or wireless signal path or paths). The NL inputs and other user inputs captured by the multi-modal user interface 212 are thereby received and processed by the VPA engine 214. In the illustrated example, the VPA engine 214 includes a number of executable software modules such as a user intent interpreter 216, a reasoner 218, and an output generator 220. Other embodiments may include additional components or modules, such as an information retrieval engine. Further, some components described herein as being included in the VPA engine 214 may be located external to the VPA 210 in some embodiments, and thus communicate with the VPA 210 by a suitable communication link such as one of the types of communication links described herein.

The user intent interpreter 216 determines a meaning of the user's NL input that it believes (e.g., has a statistically high degree of confidence) most closely matches the user's actual intent or goal of the user's communication. In the case of spoken NL dialog input, the user intent interpreter 216 (or an external automated speech recognition (ASR) system) converts the user's natural language audio into a text or otherwise machine-readable format that can be used for further analysis performed by the user intent interpreter 216. The user intent interpreter 216 may apply syntactic, grammatical, and/or semantic rules to the NL dialog input, in order to parse and/or annotate the input to better understand the user's intended meaning and/or to distill the natural language input to its significant words (e.g., by removing grammatical articles or other superfluous language).

As used herein, terms such as "goal," "objective," or "intent" are used to convey that the VPA 210 attempts to determine not only what the words of the user's conversational input mean, but the user's actual intended goal or objective, which he or she used those words to express. To do this, the VPA 210 often needs to consider the dialog context and/or other aspects of the user's current context. For example, the user might say something like "I'll take it" or "get me that one," which really means that the user's goal is to buy a certain product, where the product may have been identified by the user in a prior round of dialog or identified by the system through other multi-modal inputs (such as a tap selecting an on-screen graphic). Determining the user's intended goal or objective of a dialog often involves the application of artificial-intelligence based methods.

Some embodiments of the user intent interpreter 216 may include an automatic speech recognition (ASR) system and a natural language understanding (NLU) system. In general, an ASR system identifies spoken words and/or phrases in verbal natural language dialog inputs and recognizes and converts them into text form (e.g., words, word strings, phrases, "segments," "chunks," "sentences," or other forms of verbal expression). There are many ASR systems commercially available; one example is the DYNASPEAK system, available from SRI International. In general, an NLU system receives the ASR system's textual hypothesis of the user's NL input. Of course, where the user's NL dialog inputs are already in text form (e.g., if typed using a keypad of the computing system 200), the ASR processing may be bypassed.

The NLU system typically parses and semantically analyzes and interprets the verbal content of the user's NL dialog inputs that have been processed by the ASR system. In other words, the NLU system analyzes the words and/or phrases produced by the ASR system and determines the meaning most likely intended by the user given, for example, other words or phrases presented by the user during the dialog and/or one or more of the VPA components 222. For instance, the NLU system may apply a rule-based parser and/or a statistical parser to determine, based on the verbal context, the likely intended meaning of words or phrases that have multiple possible definitions (e.g., the word "pop" could mean that something has broken, may refer to a carbonated beverage, or may be the nickname of a person, depending on the context, including the surrounding words and/or phrases of the current dialog input, previous rounds of dialog, and/or other multi-modal inputs. A hybrid parser may arbitrate between the outputs of the rule-based parser and the statistical parser to determine which of the outputs has the better confidence value. An illustrative example of an NLU component that may be used in connection with the user intent interpreter 216 is the SRI Language Modeling Toolkit, available from SRI International.

The user intent interpreter 216 combines the likely intended meaning, goal, and/or objective derived from the user's NL dialog input as analyzed by the NLU component with any multi-modal inputs and communicates that information to the reasoner 218 in the form of a "user intent." In some embodiments, the user intent is represented as a noun-verb or action-object combination, such as "buy product" or "search product category," which specifies an activity that the user desires to have performed by the VPA and an object (e.g., person, place or thing) that is the subject of that activity. Generally speaking, the reasoner 218 synthesizes the user intent and/or any of the other available inputs in view of applicable dialog models, business logic, rules, etc. (which may be supplied by one or more of the VPA components 222). From this analysis, the reasoner 218 determines a likely appropriate task to execute on the user's behalf and/or a likely appropriate system response to the user's intended goal or objective as derived from the meaning of the inputs and reflected in the user intent (where "likely appropriate" may refer to a computed statistical measure of confidence determined and/or evaluated by the reasoner 218). In some cases, the likely appropriate system task or response may be to ask the user for additional information, while in other cases, the likely appropriate system task or response may involve building a search query based on the inputs and execute an information retrieval process, or to execute some other piece of computer program logic (e.g., to launch an external software application or follow a link to a web site). In still other cases, an appropriate system task or response may be to present information to the user in order to elicit from the user additional inputs that may help the VPA engine 214 clarify the user intent.

Some embodiments of the reasoner 218 may include a dialog manager module, which keeps track of the current state and flow of each conversation or dialog that occurs between the user and the VPA 210. The dialog manager module may apply dialog-managing rules, templates, or task flows, for example, to the user's NL dialog input that are appropriate for the user's current context. For example, the dialog manager may apply rules for determining when a conversation has started or ended, or for determining whether a current input is related to other inputs, based on one or more of the current or recently-obtained multi-modal inputs.

Once the reasoner 218 has determined an appropriate course of action by which to respond to the user's inputs, the reasoner 218 communicates an "output intent" to the output generator 220. The output intent specifies the type of output that the reasoner 218 believes (e.g., has a high degree of statistical confidence) is likely appropriate in response to the user intent, given the results of any business logic that has been executed. For example, if the user intent is "buy product" but the reasoner 218 determines by executing a "check stock" task flow that the product the user wants to buy is not available for purchase, the output intent may be "offer alternative product."

If the reasoner 218 specifies that the output is to be presented in a (system-generated) natural-language format, a natural-language generator may be used to generate a natural-language version of the output intent. If the reasoner 218 further determines that spoken natural-language is an appropriate form in which to present the output, a speech synthesizer or text-to-speech (TTS) module may be used to convert natural-language text generated by the natural-language generator (or even the un-processed output) to speech (e.g., machine-produced speech using a human or humanlike voice). Alternatively or in addition, the system output may include visually-presented material (e.g., text, graphics, or video), which may be shown on a display screen of the computing system 200, and/or other forms of output.

Each of the components 216, 218, 220 accesses and uses one or more of the domain-adapted re-usable VPA components 222. The domain-adapted re-usable VPA components 222 are versions of the re-usable VPA components 114 that have been adapted for use in connection with a particular domain that is included in the scope of the functional VPA application 210. As such, it should be understood that the re-usable VPA components 114 include any or all of the different types of components 222 shown in FIG. 2, although they are not specifically shown in FIG. 1, and/or others. More specifically, the components 222 represent a more detailed view of the components 114.

The domain-adapted components 222 can be created by applying data from a populated instance of the domain knowledge base 116 to the re-usable VPA components 114, based on the linkages between the re-usable components 114 and the ontology 112 and the linkages between the domain knowledge base 116 and the ontology 112. For example, data values in the populated instance of the domain knowledge base 116 can be mapped to their corresponding parameters in the re-usable components 114. The domain-adapted re-usable VPA components 222 include a number of different components that "feed" the various executable modules of the VPA engine 214, as described above. In some embodiments, these components individually or collectively may be referred to as a "models," "dialog models," or by other terminology.

The NL grammars 224 include, for example, text phrases and combinations of text phrases and variables or parameters, which represent various alternative forms of NL dialog input that the VPA 210 may expect to receive from the user. As such, the NL grammars 224 help the VPA engine 214, the user intent interpreter 216, or more specifically, a rule-based (e.g., PHOENIX) parser, map the user's actual NL dialog input to a user intent. Some examples of NL grammars 224 that may be associated with various ontological concepts of an e-commerce ontology 710 are shown in FIG. 7, described below. Some examples of NL grammars 224 that may be associated with a user intent of "buy product" in a VPA application for the domain of e-commerce are shown in column 1012 of FIG. 10. A statistical parser is another mechanism by which the user intent interpreter 216 (or an NLU portion thereof) may determine user intent. Whereas the rule-based parser uses the NL grammars 224, the statistical parser uses a statistical model 242 that models different user statements and determines therefrom (statistically), the most likely appropriate user intent.

The intents 226 are, as described above, computer-intelligible forms of the intended goal of the user's NL dialog input as interpreted by the user intent interpreter 216. As such, the intents 226 may be derived from other re-usable components 222 (i.e., the grammars 224 and statistical models 242). The intents 226 help the VPA engine 214 or the reasoner 218, more specifically, determine an appropriate course of action in response to the user's NL dialog input. As noted above, the user intent may be represented as a noun-verb/action combination such as "buy product." Some examples of intents 226 that may be linked with various ontological concepts in the e-commerce ontology 710 are shown in FIG. 8, described below. Referring to FIG. 10, each of the grammars shown in column 1012 is associated with the "buy product" intent. In other words, if a user says, "let's go ahead and check out," an embodiment of the VPA 210 constructed with the VPA builder 1010 of FIG. 10 may deduce that the user intends to buy the product, based on the association of that NL grammar (or a similar grammar) with the "buy product" intent in the ontology 710, and proceed accordingly.

The interpreter flows 228 are devices that help the VPA engine 214 or more specifically, the user intent interpreter 216, determine the intended meaning or goal of the user's NL dialog inputs. For example, the interpreter flows 228 may include combinations or sequences of NL dialog inputs that, if they occur in temporal proximity, may indicate a particular user intent.

The task flows 230 (which may be referred to as "business logic," "workflows" or by other terminology) define actions that the VPA 210 may perform in response to the user's NL dialog inputs and/or other multi-modal inputs, or in response to the completion of another task flow. As such, the task flows may include combinations or sequences of function calls or procedure calls and parameters or arguments. Some examples of task flows 230 are illustrated in FIG. 8 and in column 1014 of FIG. 10.

The rules 232 may include a number of different rules (e.g., if-then logic) that may be applied by the VPA engine 214. For example, a rule used by the output generator 220 may stipulate that only text or visual output is to be generated if the user's NL dialog input is entered as text input as opposed to audio. The NL responses 234 are similar to the NL grammars 224 in that they include, for example, text phrases and combinations of text phrases and variables or parameters, which represent various alternative forms of possible system-generated NL dialog output that the VPA 210 may present to the user. As such, the NL responses 234 help the VPA engine 214 or the output generator 220, more specifically, map the output intent formulated by the reasoner 218 to an appropriate NL dialog output. Some examples of NL responses 234 that may be associated with various ontological concepts of an e-commerce ontology 710 are shown in FIG. 7, described below. Some examples of NL responses 234 that may be associated with a user intent of "buy product" in a VPA application for the domain of e-commerce are shown in column 1016 of FIG. 10. The output templates 236 may be used by the VPA engine 214 or more particularly, the output generator 220, to formulate a multi-modal response to the user (e.g., a combination of NL dialog and graphics or digital images). In some embodiments, the output templates 236 map to one or more NL responses 234 and/or output intents.

The acoustic models 238, language models 240, and statistical models 242 are additional VPA components that can be defined at a general-purpose level and then adapted to one or more particular domains through the ontology 112. The VPA engine 200 or more specifically, the user intent interpreter 216 and/or the reasoner 218 may consult one or more of the models 238, 240, 242 to determine the most likely user input intent as described above. For example, embodiments of the user intent interpreter 216 or more specifically, an ASR component, may utilize the acoustic models 238 to map orally-articulated words or phrases to their textual counterparts. In some embodiments, a standard high-bandwidth acoustic model may be adapted to account for particular phraseology or vocabulary that might be specific to a domain. For instance, terminology such as "boot cut" and "acid wash" may have importance to a VPA application that is directed to the sale of women's jeans but may be meaningless in other contexts. Thus, a VPA developer may be prompted to include mathematical representations of the audio speech of those terms in an acoustic model 238 by virtue of the inclusion of those terms in a domain knowledge base 116 that is linked to the ontology 112 (and to which the acoustic model 238 is also linked). Similarly, the language models 240 (which may, for example, determine whether a sequence of words recognized by an ASR module represents a question or a statement) and statistical models 242 (described above) may be provided with the VPA development platform 110 as re-usable components 114 and adapted for use in connection with a specific domain.

Figure 3:
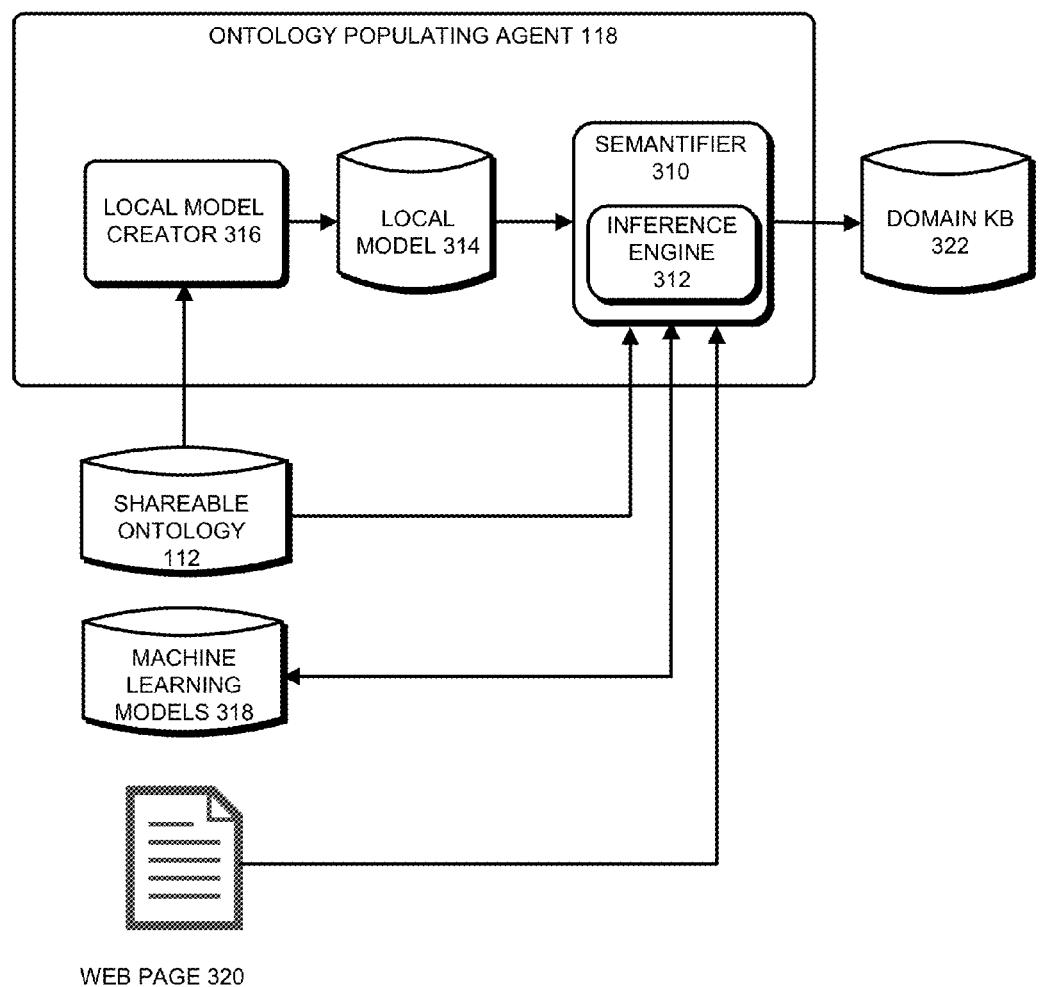
FIG. 3 is a simplified module diagram of at least one embodiment of the ontology populating agent of FIG. 1.
Figure 4:
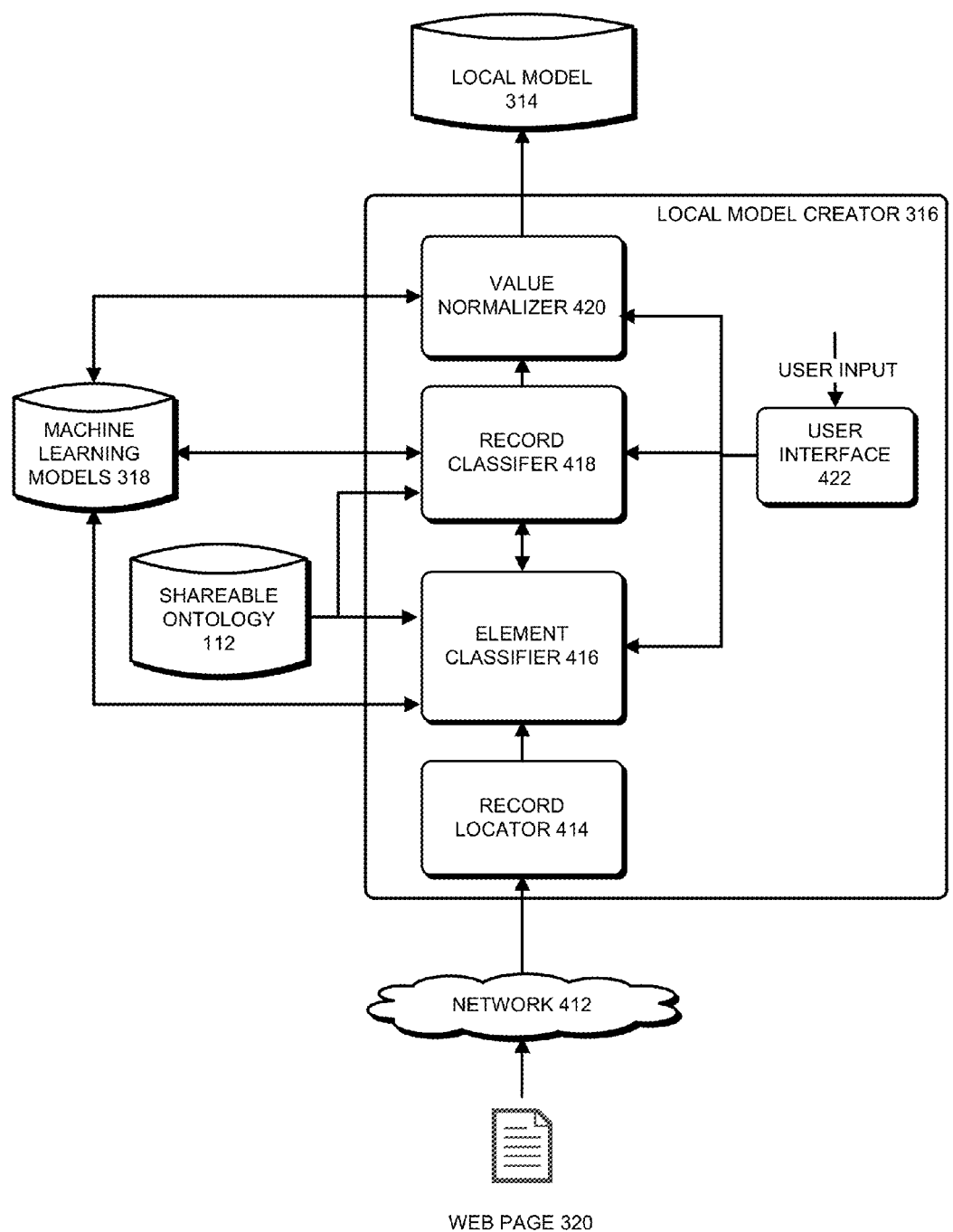
FIG. 4 is a simplified module diagram of at least one embodiment of the local model creator of FIG. 3.
Figure 5:
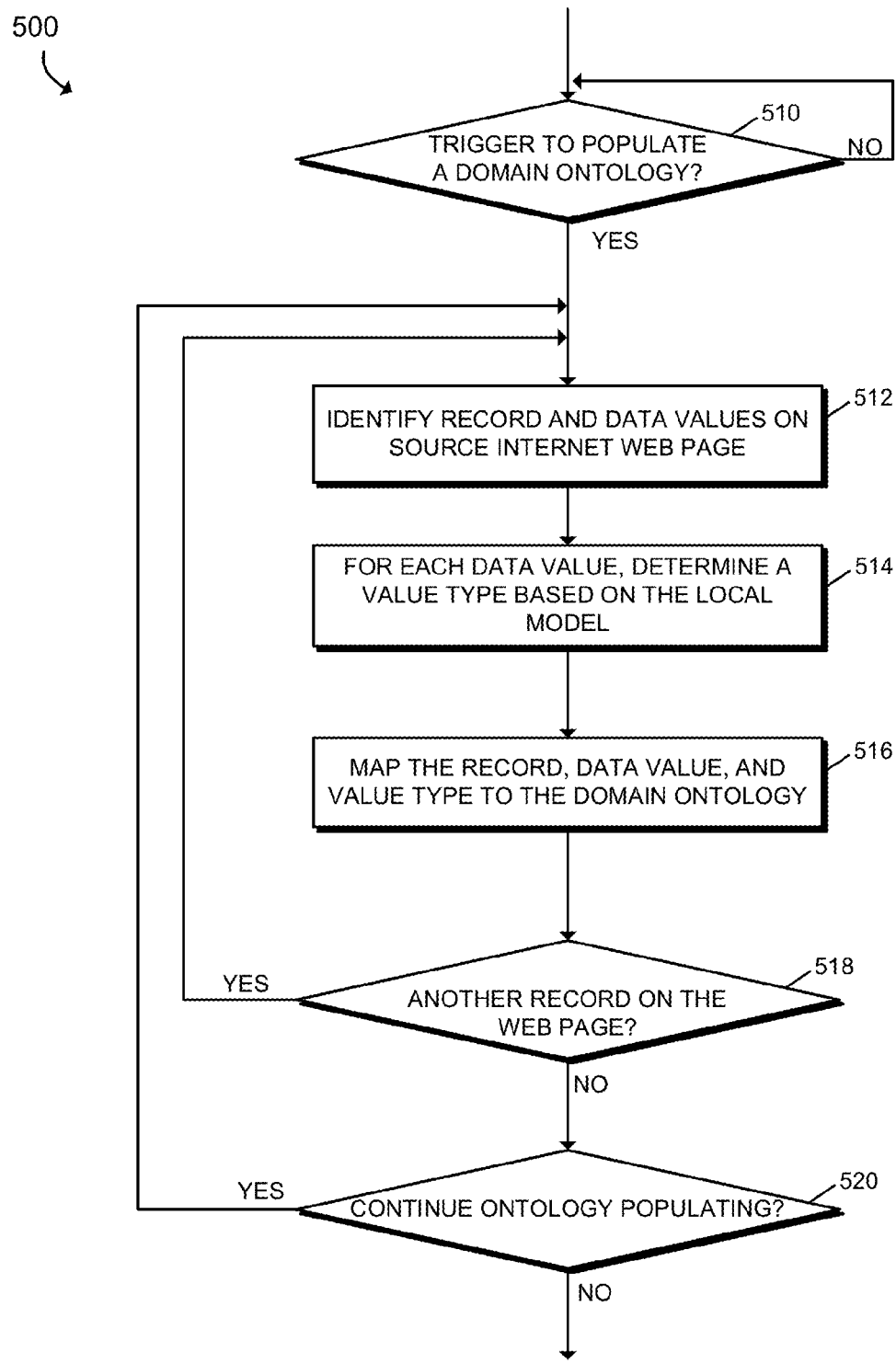
FIG. 5 is a simplified flow diagram of at least one embodiment of a method for populating a domain ontology as disclosed herein.

FIGS. 3-5 illustrate aspects of the ontology populating agent 118 in greater detail. Referring now to FIG. 3, an embodiment of the ontology populating agent 118 includes a semantifier 310, an inference engine 312, a local model 314, and a local model creator 316. Using the ontology 112, the local model 314, and one or more machine learning models 318, the illustrative semantifier 310 adds domain-specific instances 322 to the domain knowledge base 116, based on the data values gleaned from a web page 320 (or another similar electronic data source), in an automated or at least partially automated fashion. As a result, the data values in the domain knowledge base 322 map to the ontological concepts, properties, and relationships of the ontology 112. The semantifier 310 analyzes all of the available information about the domain, e.g., the local model 314, the ontology 112, the machine learning models 318, and the data values contained on the web page 320 itself, and converts that information into a semantic representation of the domain knowledge, which is stored in the domain knowledge base 322. As used herein, "semantic representation" or "semantic interpretation" may refer to a structured representation of data that indicates the data value itself and the meaning or data type associated with such value. For instance, a semantic representation of "$1.99" may be: "(sale price=)$1.99," while a semantic representation of "Jack Jones" may be: "(author name=)Jack-Jones." In some embodiments, the semantic interpretation of the data may result in the data being assigned by the semantifier 310 to certain tables and/or fields of a database implementation of the domain knowledge base 322.

Some embodiments of the semantifier 310 include an inference engine 312. Other embodiments of the semantifier 310 may not include the inference engine 312, in which case additional manual effort may be required in order to perform the semantic interpretation of the web page 320 and populate the domain knowledge base 322. The illustrative inference engine 312 interfaces with the ontology 112, the local model 314, and the machine learning models 318 to provide proactive or even "hands free" semantification of the data contained in the web page 320. For example, the inference engine 312 interfaces with the ontology 112 to learn about the kind of data values it should expect to find in the local model 316 and how data values may combine to form composite semantic objects. As a result, the semantifier 310 can more quickly populate the domain knowledge base 116 with data objects that correspond to the concepts, properties and relationships in the ontology 112.

The inference engine 312 interfaces with the local model 314 to learn, for a given web page 320, how to instantiate the ontological entities and properties in the knowledge base 322. For example, the inference engine 312 may learn from the local model 314 where certain types of data elements are located on the particular web page 320 in relation to the web page as a whole and/or in relation to other data elements. As a result, the semantifier 310 can more quickly associate or assign the various data elements of the web page 320 with the corresponding portions of the ontology 112. The local model 314 is created by the local model creator 316, which is described in more detail below with reference to FIG. 4.

The inference engine 312 interfaces with the machine learning models 318 to retain learning from previous semantification sessions. The machine learning models 318 are derived by automated machine learning algorithms or procedures, such as supervised learning procedures that may be executed during the process of creating the local model 314 (FIG. 4). Such algorithms or procedures analyze patterns of data and/or user behavior that tend to reoccur over time and draw inferences based on those patterns. In some embodiments, a combination of different machine learning algorithms may be used. For example, a version space learning algorithm may be used to locate different data elements on a web page and/or to learn the appropriate string transformations (i.e., normalization), while an averaged perception algorithm or other "generic" machine learning procedure may be used to learn the structure of different types of string values to predict the correct ontological type. Any of a number of different machine learning algorithms may be applied to develop the local model 314, including those mentioned above, decision tree induction, neural networks, support vector machines, naïve Bayes, and/or others.

The machine learning models 318 allow the inference engine 312 to retain previously-learned associations and data mappings over time. For example, over time, the inference engine 312 may come to recognize the web page 320 represents the web page of a particular e-commerce vendor like BARNESANDNOBLE.COM after only having been previously exposed to a more "generic" e-commerce web page, for example, a web page for AMAZON.COM, and thereby quickly establish the mapping from the record located on the web page 320 to the ontological concepts and properties in the ontology 112. This can enable the semantifier 310 to perform the semantic interpretation more quickly in future sessions, and ultimately, with little or no human involvement. The bidirectional arrow in FIG. 3 (and similarly in FIG. 4) connecting the machine learning models 318 with other components indicates two-way data communications. For example, in FIG. 3, conclusions made by the semantifier 310 in certain instances of semantification are used to update the machine learning models 318, and vice versa.

The data values contained in the web page 320 can be extracted from the web page 320 using any suitable web mining or web scraping technique. One example of a web scraping tool is OUTWIT HUB. In general, these tools identify content (e.g., text, graphics, and/or video) that is displayed on Internet web pages and copy the content to a spreadsheet, table, or other electronic file. In some embodiments, a web scraping tool like OUTWIT HUB may be used to preliminarily scrape the data from the web page 320 and provide it to the semantifier 310; however, additional programming would likely be needed to achieve many of the features that are automated by the ontology populating agent 118 as described herein. In other embodiments, the web scraping or web mining mechanism may be incorporated into the semantifier 310, itself (e.g., as part of the ontology populating agent 118).

The ontology populating agent 118 can be executed one time or multiple times, as often as needed. For instance, the ontology populating agent 118 may be run the first time to populate the domain knowledge base 322 in preparation for the creation of a VPA application 210 for a specific domain. The ontology populating agent 118 may be run subsequently on a timed schedule (e.g., weekly or monthly) or as needed, to update the data values in the domain knowledge base 322 or to update the local model 314 (e.g., in the event the format of the web page 320 or the arrangement of the data thereon changes). For example, in the e-commerce context, the ontology populating agent 118 may be run more frequently during certain times of the year that are considered "sale" periods (like holidays and back-to-school sale periods), to account for frequent price changes, changes in product availability, and the like.

Further, the ontology populating agent 118 is applicable across different domains, to create domain knowledge bases 322 for multiple different domains. For example, if a VPA is being developed for a department-store e-commerce vendor, the ontology populating agent 118 may be run one time to create a domain knowledge base from a "ladies' shoes" web page and another time to create a domain knowledge base from a "men's shirts" web page. Such knowledge bases for different domains can be linked with one another through the ontology 112, in some embodiments, as discussed elsewhere herein. In view of the foregoing, references herein to the web page 320 may refer, in various embodiments, to an initial version or instance of a particular web page, to a subsequent version or instance of the same web page, or to an entirely different web page.

An update to the domain knowledge base 322 made by the ontology populating agent 118 may trigger a corresponding update to the VPA application 210. For example, the ontology populating agent 118 may send an electronic notification to the VPA developer through the ontology visualization module 120 or some other electronic communication mechanism (e.g., email or text message), whenever the agent 118 has finished updating the domain knowledge base 322, to signal that the VPA application 210 may need to be updated as well.

Referring now to FIG. 4, an embodiment of the local model creator 316, which creates and updates the local model 314 from time to time for a specific domain (as defined by the web page 320 or a subsequent version of it), is shown. The local model creator 316 includes a record locator 414, an element classifier 416, a record classifier 418, a value normalizer 420, and a user interface 422. The local model creator 316 accesses or receives the web page 320 (or a scraped version thereof, as discussed above) by electronic transmission over a network 412 (e.g., the Internet). The local model creator 316 interfaces with the ontology 112 and the machine learning models 318 to analyze the web content of the web page 320 and locate particular data records and values thereon. The local model creator 316 uses statistical classifiers to formulate hypotheses as to the identification of and location of the different types of content that are present on the web page, and such hypotheses are stored in the local model 314. Further, once content is classified, the local model creator 316 prepares the content for use by the VPA development platform 110 and/or the ultimately-developed VPA application 210 created therefrom.

The illustrative record locator 414 analyzes the web page 320 and attempts to interpret the web page 320 as a list of objects, or as multiple lists of data objects, where each data object has a set of corresponding properties. As used herein, references to "data" or "data objects" may refer to any type of electronic content, including alphanumeric text, graphics, recorded audio or video, and/or others. The record locator 414 typically does not determine the semantics associated with the data objects and properties from the web page 320, but simply organizes the data objects into lists of items that appear to relate to the same thing, which is considered to be a "record." For example, the record locator 414 may create a "pants" list that contains a picture of a person wearing a pair of pants and the textual elements that appear below the picture on the web page 320, but the record locator 414 doesn't yet know that the record corresponds to pants. If another picture of another pair of pants appears on the same page with text below the picture, the record locator may create another list/record, similarly.

The illustrative element classifier 416 analyzes the data elements in each of the object lists/records discovered by the record locator 414 on the web page 320, and attempts to determine therefrom the type of data value that each element in the record represents (e.g., by looking at the string it contains, or by reviewing any associated meta data). To do this, the element classifier 416 obtains the possible value types from the ontology 112. In other words, the element classifier 416 attempts to map the data elements in each of the object lists to properties that are defined in the ontology 112, in order to identify the ontological concept associated with those data elements. As such, the local model creator 316 typically proceeds in a "bottom-up" fashion to derive the ontological concept(s) that are applicable to the web page 320 based on the properties that are associated with the individual data elements on the page. The output of the element classifier 416 is typically a set of predicted value types, along with confidences (e.g., a computed numerical score that represent how certain the element classifier 416 is about a particular value type assignment).

For example, if a data value is "$5.99," and the ontology 112 only has one interpretation for a price (e.g., a "list price"), the element classifier 416 may predict with a high degree of confidence that the data value "$5.99" corresponds to the value type of "list price." However, if the ontology has multiple interpretations for a price (e.g., a "regular price" and a "sale price"), the element classifier 416 may still predict that the data value $5.99 corresponds to a price (based on the data including a numerical value preceded by the "$" symbol), but then may consult the machine learning model 318 to determine whether it is more likely that the data value is a regular price or a sale price. If the element classifier 416 is uncertain, it may make a guess and assign a value type of "regular price" to the data value, but with a lower degree of confidence. In some cases, the element classifier 416 may prompt the user to review and provide feedback on its guess, via the user interface 422. In other cases, for example if the confidence value is very low, the element classifier 416 may simply ask the user to select the applicable ontological property/value type without first making a guess.

The illustrative record classifier 418 reconciles all of the element-level value type predictions and user-input assignments of value types/properties and maps the entire record into an ontological object type or concept based on an actual or inferred common characteristic. For example, if the element classifier 416 concludes that an object list contains data values for a size, price, description, color, and inseam, the record classifier 418 may conclude that this particular combination of data elements likely corresponds to the properties of a "pants" concept of the ontology 112, and assign a confidence value to its prediction. The record classifier 418 may thus interface with the ontology 112 and the machine learning models 318 in a similar manner as described above. The bidirectional arrow between the element classifier 416 and the record classifier 418 indicates bidirectional communication. Property or value type assignments that are made by the element classifier 416 (or by the user to the element classifier 416 via the user interface 422) are used by the record classifier 418 to resolve any ambiguities in the classification of the record. Similarly, once the record classifier 418 has made a prediction as to the proper record classification, the record classifier 418 provides that information to the element classifier 416. Based on the ontology 112 and given the record/concept classification, the element classifier 416 can then have greater clarity as to the properties and value types that should be associated with the record. Here again, the user may input a record/concept assignment manually through the user interface 422. Such user-supplied assignments of properties and concepts may be assumed to have the same level of confidence as a highly confident assignment made by the record classifier 418 or element classifier 416, as the case may be.

For example, a "date" element may have many possible interpretations in the ontology 112, but its observed co-occurrence with other data elements on the web page 320 that have already been classified with a high degree of confidence by one or more of the classifiers 416, 418 may provide a strong indication of its likely appropriate assignment. For instance, if other nearby data elements are classified as name, height, and weight, the element classifier 416 may classify the date value as a birth date, which may lead the record classifier 418 to classify the record as a "person" or "personal health" record, which may then lead the element classifier 416 to review and re-classify other data elements (for example, to re-classify a data value of "blue" as "eye color" instead of "color").

The illustrative value normalizer 420 prepares the classified records and data values for use by downstream software components. For example, if the VPA application 210 expects numerical and date values to be spelled out, the value normalizer 420 may perform this conversion before the data is stored in the domain knowledge base 116. The value normalizer 420 similarly transforms other types of data values into the form that may be required by the platform 110 and/or the VPA 210. As another example, if the VPA application 210 requires first and last names to be separated (e.g., stored in separate fields), the value normalizer 420 may perform the task of separating the name data into first and last names.

In some cases, the normalization procedure may be demonstrated by the user via the user interface 422. For instance, the user may provide a few examples of the desired form of the information, and the value normalizer 420 may use the machine learning models 318 to acquire the desired transformation. As with other aspects of the local model creator 316, over time and with the help of the machine learning models 318, the value normalizer may acquire enough structural knowledge about a value type that it can predict the necessary transformations without any user input. In such cases, the local model creator 316 may display predictions to the user via the user interface 422 for verification. The normalized data values, element types, and mappings to ontological concepts and properties generated by the local model creator 316 are stored in the local model 314, which is then used by the semantifier 310 to convert data newly appearing on the web page 320 (and/or other web pages) into information that is usable by the platform 110 and/or the VPA 210.

In some embodiments, the semantifier 310 and/or other components of the ontology populating agent 118 may interface with one or more components of the VPA engine 214, such as the user intent interpreter 216. Various components of the user intent interpreter 216 processes portions of the NL dialog user input during the "live" operation of the VPA 210 and need to figure out what it means and/or what to do with the live input. For instance, if a user says to the VPA, "I'll take it for seventy nine ninety five," the VPA 210 needs to determine whether the user means "$79.95" or "$7,995." Thus, if a component of the VPA engine 210 can make these determinations and communicate with the ontology populating agent 118 accordingly, the semantifier's job of normalizing data obtained from the web page 320 may be simplified.

In some embodiments, the semantifier 310 or another component of the ontology populating agent 118 may, through the ontology 112, have access to certain of the VPA components 114 (such as grammars or user utterances mapped to grammars). Such access may assist the ontology populating agent 118 in recognizing data elements or records on the web page 320, by giving it a supplementary set of features in the form of typical vocabulary that is associated with various semantic types.

The user interface 422 may be embodied as any suitable type of human-computer interface that allows an end user to review the input that is undergoing semantification and the system output (e.g., classifier predictions), and input data and/or feedback (e.g., mouse clicks, taps, vocal commands, etc.) to the local model creator 316. For example, the user interface 422 may include a web browser and/or other software components that interface with one or more of the user input devices 1118 discussed below with reference to FIG. 11.

Referring now to FIG. 5, an illustrative method 500 for populating a domain ontology is shown. The method 500 may be embodied as computerized programs, routines, logic and/or instructions executed by the computing system 100, for example by the ontology populating agent 118 or the semantifier 310. The method 500 begins with the assumption that the local model 314 has already been developed (e.g., by the local model creator 316). As such, populating the ontology is now just a matter of consulting the local model 314, which tells the system 100 (e.g., the populating agent 118) precisely where to look for each record, property, semantic information, etc., on the web page 320. In other words, at the beginning of the method 500, all of the "hard work" has already been performed by the local model creator 316 (to create the local model 314), and the system 100, or more specifically the semantifier 310, is in possession of clear instructions for populating the ontology from a particular web page or web site (by interfacing with the local model 314).

At block 510, the system 100 determines whether a triggering event has occurred to initiate the process of populating a domain ontology (which may be instantiated as a domain knowledge base 116). As discussed above, the triggering event may be, for example, a recent update to a web page 320, the expiration of a period of time, the occurrence of a certain date on the calendar, or user input. If no such event has occurred, the system 100 simply remains at block 510 or does nothing.

At block 512, the system 100 reads the source web page 320 (or other electronic data source, as mentioned above) and identifies the record and data values on the page using the local model 314. As noted above, the local model creator 316 has previously learned the locations and value types of records and data values on the web page 320 by applying, for example, the record locator 414, the element classifier 416, the record classifier 418, and the value normalizer 420 to a previous version of the web page 320 and/or other training data. At block 514, the system 100 uses the local model 314 to determine a likely value type that corresponds to each of the identified data values. The system 100 maps the record, data value, and value type information to the concepts, properties, and relationships defined in the domain ontology (e.g., the ontology 112), at block 516.

At block 518, the system 100 determines whether there are any other records on the web page 320 that need to be processed. Such may be the case if, for example, the web page contains a display of search results, such as a listing of a variety of different purchasable items. If there is another record to be processed on the web page 320, the system 100 returns to block 512 and begins processing the new record as described above. If all of the records on the current web page 320 have been processed, the populating of the domain ontology based on the current web page concludes and the system 100 proceeds to block 520. At block 520, the system 100 determines whether to continue, e.g., to continue populating the same domain ontology or begin populating another domain ontology. This may be the case if, for example, the end VPA application 210 is to be directed to multiple domains (e.g., a department store or "big box" retailer, in the e-commerce context), or if another web page needs to be processed to complete the populating of the current domain ontology. In such event, the system returns to block 512 and continues the ontology populating processes. If no further ontology populating is needed, the system 100 ends the ontology populating processes until another triggering event is detected. The decisions made at blocks 518 and 520 may be made by the system 100 based on user inputs at each of those steps, or programmatically based on information that is then available to the system 100.

Figure 6:
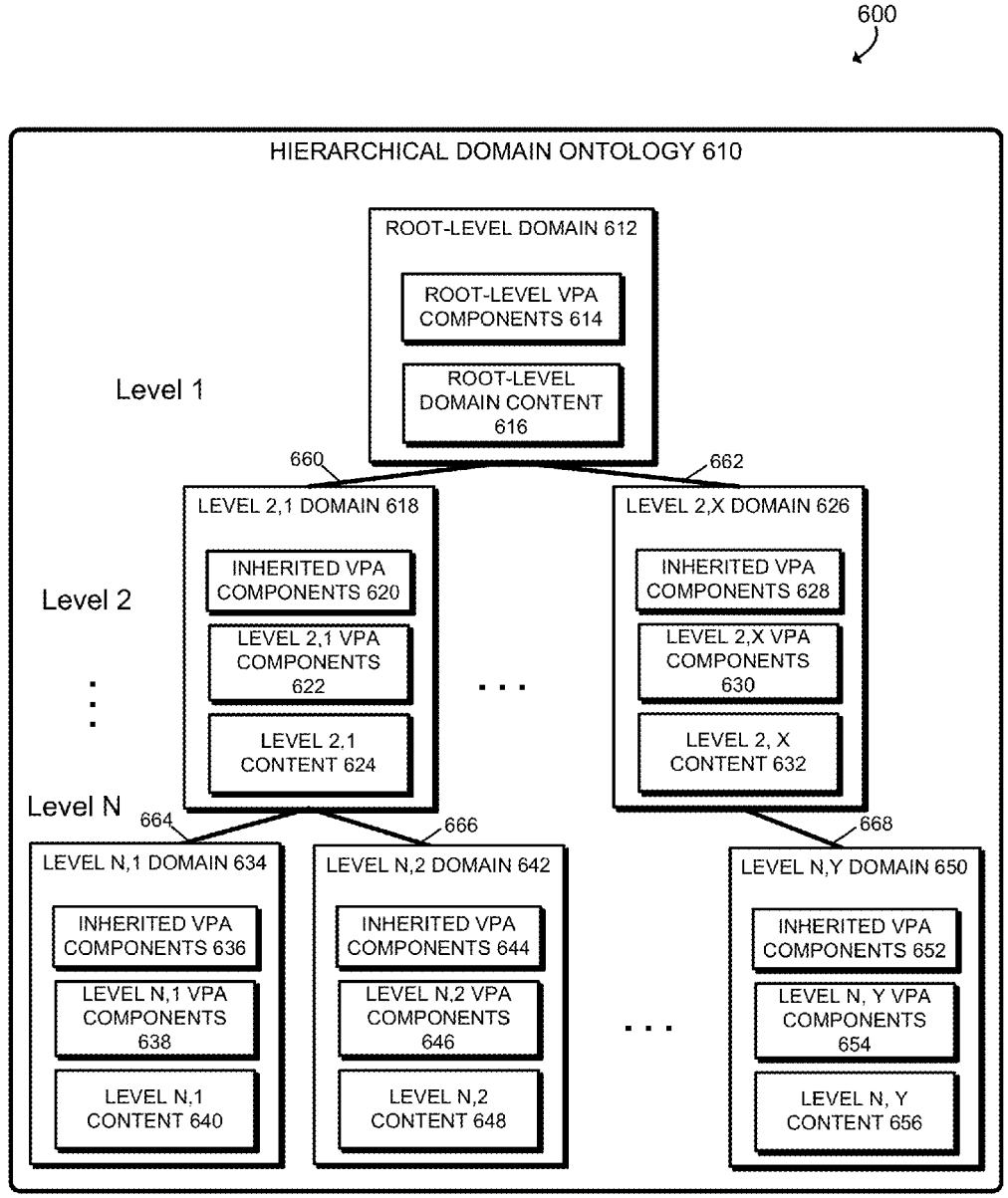
FIG. 6 is a simplified graphical representation of at least one embodiment of a hierarchical domain ontology as disclosed herein.

Referring now to FIG. 6, a graphical representation 600 of an embodiment of a hierarchical domain ontology 610 is shown. The ontology 610 may be used in connection with the platform 110, e.g., as a populated version of the shareable ontology 112, described above (e.g., as an overall ontological structure that also has several populated "leaves" or "nodes"). For instance, the semantifier 310 may have already "fed" the structure or portions thereof with real data values, or the data may have been obtained in some other way. In that sense, the ontology 610 may be viewed as one illustrative implementation of a domain knowledge base 116 or a hierarchy of such knowledge bases.

The illustrative ontology 610 is hierarchical in design, in that ontological concepts or entities are arranged according to inheritance relationships indicated by the connections 660, 662, 664, 666, 668. Illustratively, each of the ontological concepts or entities 612, 618, 626, 634, 642, 650 are referred to in FIG. 6 as "domains," based on the idea that any ontological concept can represent a domain for purposes of defining the scope of a particular VPA application 210. On the other hand, a VPA application 210 may encompass in its scope more than one of the "domains" 612, 618, 626, 634, 642, 650, in which case those domains may be considered sub-domains of a broader domain. Moreover, in some embodiments, one or more of the domains 612, 618, 626, 634, 642, 650 may refer not simply to an ontological concept, but another ontology altogether. That is, in some embodiments, the ontology 610 may actually be embodied as a hierarchy of (hierarchical) ontologies. Further, for purposes of the platform 110, the "ontology" 112 may be defined to include all or any portion of the hierarchical ontology 610. For example, in some embodiments, levels 1 and 2 may be sufficient, while in other embodiments, all of the levels 1 to N (where N is any positive integer) may be needed. Additionally, in some embodiments, the ontology 112 may be defined to include some "chains" of inheritance or portions thereof but not others (e.g., the right side 612, 626, 650 but not the left side 618, 634, 642).

Each of the domains in the ontology 610 includes or has associated therewith a number of VPA components and content, which are linked with the domains based on common characteristics, through computer programming statements or other automated or partially mechanisms as described above. Illustratively, the root-level domain 612 defines a general purpose or shared ontology that includes or links with default VPA components 614 and root-level content 616. For example, if the root-level domain 612 is "e-commerce," a default or root-level VPA component 614 might include a generic "buy product" intent or an "add to cart" task flow, while the root-level content 616 may include the names of high-level product categories (e.g., health care, financial, business) and/or product properties at a high level (e.g., quantity, price). Each of the levels 2 through N below the root level define increasingly greater degrees of domain or concept specificity. In other words, the root level domain 612 defines the highest degree of abstraction in the ontology 610. Each of the levels 2 through N can include any number of domains or ontological entities. For instance, level 2 may include X number of domains, and level N may include Y number of domains, where N, X, and Y may be the same or different positive integers.

The root-level VPA components 614 and content 616 are inheritable by the sub-domains 618, 626 by virtue of the inheritance relationships 660, 662. As such, the sub-domains 618, 626 include or are linked with inherited VPA components 620, 628, which may include all of the root-level components 614 by virtue of the subsumption relationship. In addition, the domains 618, 626 include or are linked with domain-specific VPA components 622, 630, respectively, which are typically domain-adapted versions of the inherited components 620, 628 but may also include other customized VPA components that have no applicability to the root-level domain 612. The level 2 domains 618, 626 also include or are linked with content 624, 632, respectively, which may include the root-level content 616 by virtue of the subsumption relationship, but may also include domain-specific content such as domain-specific properties. Similarly, the level N domains 634, 642, 650 inherit the root level components and content 614, 616, as well as the level 2 components 620, 628 and content 624, 632, respectively, but also may include or are linked with domain-adapted and/or domain-specific VPA components 638, 646, 654 and content 640, 648, 656, respectively. In this way, a developer using the platform 110 to develop a VPA application for the domain 634, for example, may automatically have access to the VPA components 614, 622 and therefore not have to create those components by hand.

Figure 7:
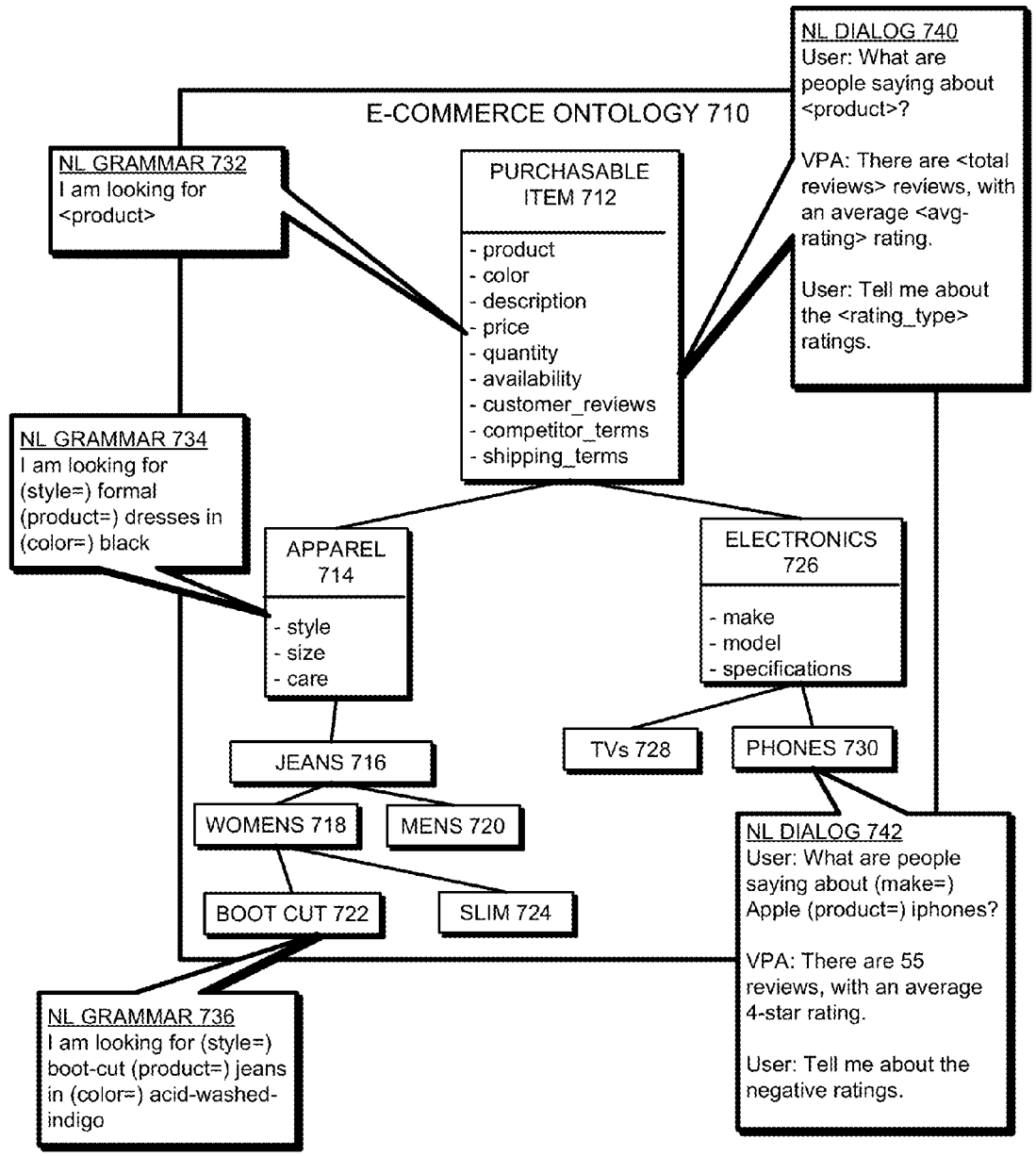
FIG. 7 is a simplified graphical representation of at least one embodiment of aspects of a VPA model for an e-commerce domain, which may be created using the platform of FIG. 1.
Figure 8:
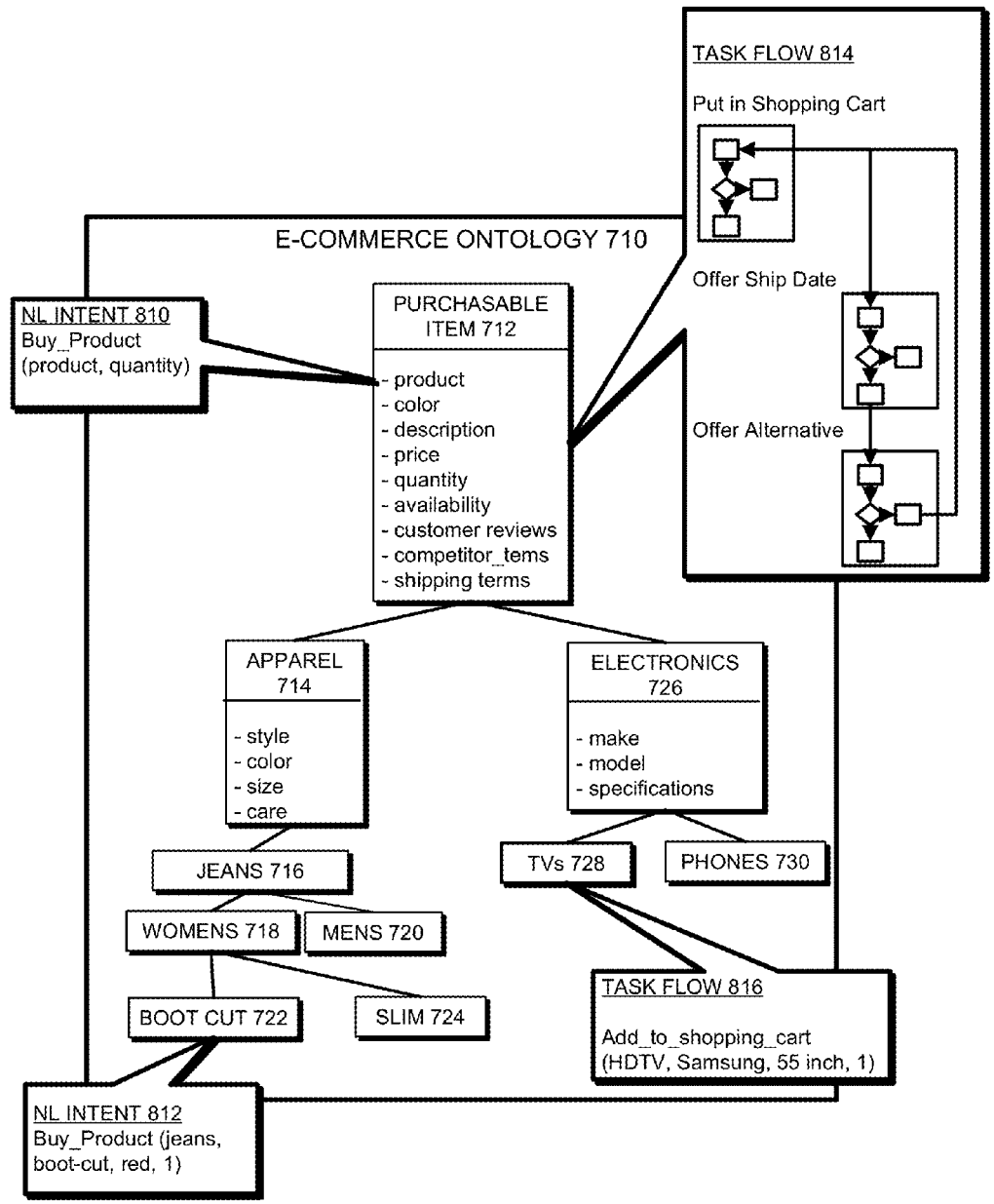
FIG. 8 is a simplified graphical representation of at least one embodiment of additional aspects of the VPA model of FIG. 7.

The inheritability of the re-usable VPA components 114 is further illustrated by FIGS. 7-8. Referring now to FIGS. 7-8, an embodiment of a VPA model, including an e-commerce ontology 710 created using the hierarchical ontology 610, is shown. The illustrative e-commerce ontology 610 includes a general purpose ontological concept of "purchasable item" 712, which includes or is linked with a general purpose NL grammar 732 and a general purpose NL dialog 740. As can be seen in FIG. 7, these general purpose components 732, 740 include parameters (<product>, <avg-rating>, <rating type>), which can be replaced with domain-specific data values.

The NL grammars 734, 736 illustrate domain-specific instances of the general purpose grammar 732, and the NL dialog 742 illustrates a domain-specific instance of the NL dialog 740. The NL grammar 734 is included in or linked with the apparel ontological concept 714, which has a few properties (style, size, and care) that are not inherited from the purchasable item 712. The domain-adapted version 734 of the grammar 732 adds the style property and data values corresponding to each of the style, product, and color parameters. Thus, once these components are created and linked with the ontology 710, a developer working on a VPA application 210 for apparel may, using the platform 110, select the apparel 714 concept and automatically have access to both the grammar 734 and the grammar 732. Likewise, the grammar 736 represents another domain-specific adaptation of the grammar 732, which may be created easily by the developer using the platform 110, by adapting or creating a new version of either the grammar 732 or the grammar 734 to include the specific data values for boot-cut jeans in acid-washed indigo. The dialog 742 may be created by a developer using the platform 110 in a similar manner, by adapting or creating a new version of the dialog 740 that includes the specific data values for smart phones.

It should be appreciated that the illustrations of FIGS. 7-8 and 10 are highly simplified. Referring to FIG. 7, only a single phrase that maps to the input intent "product search," is illustrated. However, there are typically numerous (e.g., in the thousands or more) of different ways that humans express themselves in NL dialog that all map to the same intent, "product search." Thus, the developer working on the VPA application for apparel 714 using the platform 110 has an enormous head start by having automated access to these many thousands of variations of grammars 734 that have already been successfully used in other (pre-existing) domains.

Other types of VPA components 114 can be made re-usable through the inheritance relationships of the ontology 710, as shown in FIG. 8. In FIG. 8, the intent 810 and the task flow 814 represent default re-usable VPA components 114 while the intent 812 and task flow 816 represent domain-adapted versions of the same. Thus, a developer creating a VPA 210 for either apparel or electronics may, using the platform 110, automatically have access to the intent 810 and the task flow 814, due to the inheritance relationships between each of those concepts 714, 726 and the purchasable item 712. As above, the illustration of task flows in FIG. 8 is highly simplified. In practice, there are many such task flows, beyond just the ones illustrated here, and all of those task flows would be made available to the developer in an automated fashion by virtue of the linkages with the ontology 710.

Figure 9:
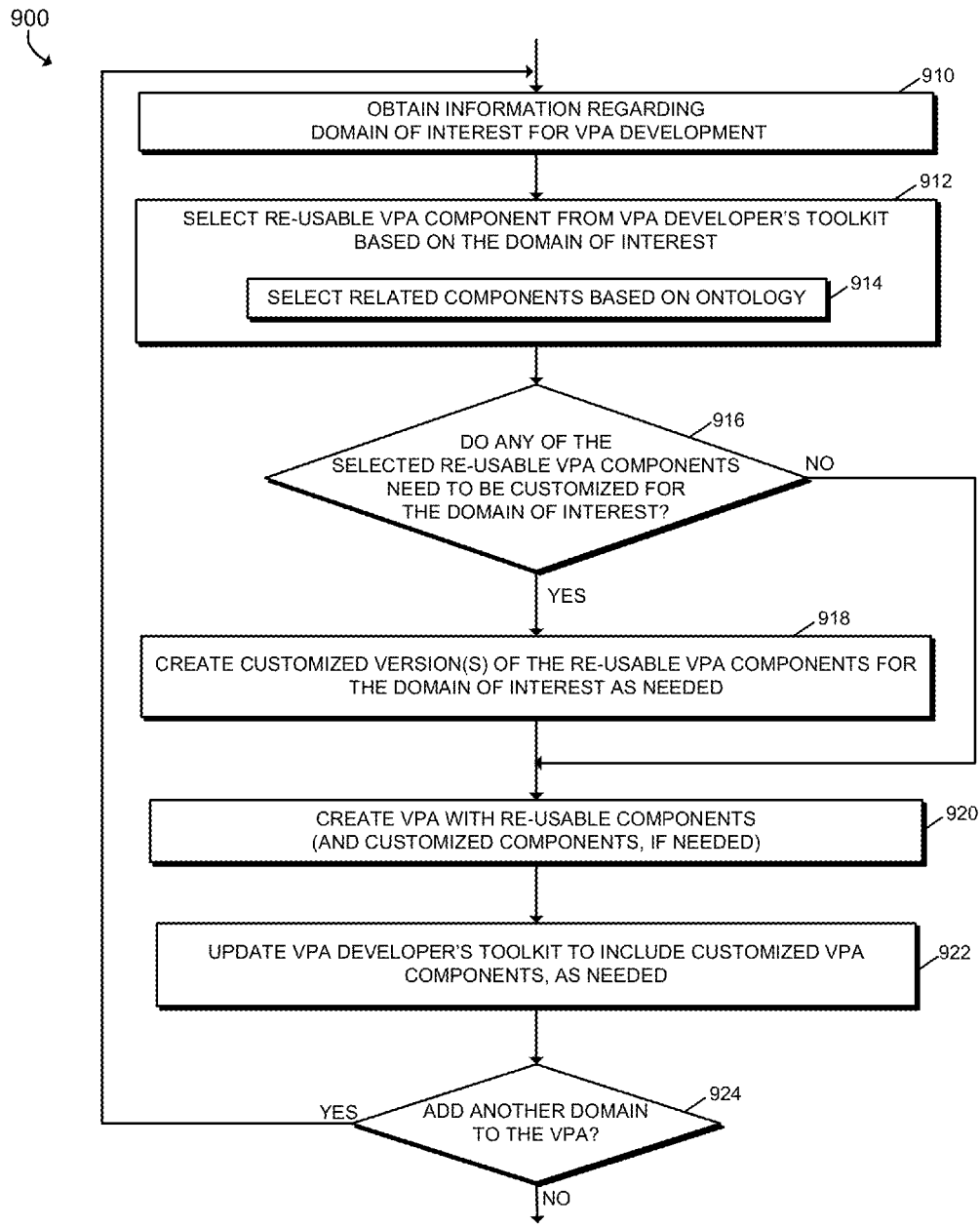
FIG. 9 is a simplified flow diagram of at least one embodiment of a method for developing a VPA application using the platform of FIG. 1.

Referring now to FIG. 9, an illustrative method 900 for developing a VPA application using the tools and techniques disclosed herein is shown. The method 900 may be embodied as computerized programs, routines, logic and/or instructions that may be executed by the computing system 100, by the VPA development platform 110, for example. At block 910, the system 100 determines a domain of interest for the development of the VPA application. The domain of interest may be obtained though interaction with the user via the ontology visualization module 120, or by other means. For example, the developer may simply click on or otherwise select a graphical element corresponding to the domain of interest on a tree-like depiction of the ontology 112, such as is shown in FIGS. 6-8.

At block 912, the system 100 selects the re-usable VPA components 114 from the VPA developer's toolkit (e.g., the platform 110), and any pertinent related components, based on the ontology 112 (block 914) and the domain of interest. To do this, the system 100 may present a graphical user interface such as is shown in FIG. 10, and may allow the developer to select all of the VPA components 114 associated with a particular ontological concept simply by clicking on or otherwise selecting the desired concept in the tree-like depiction of the ontology 112. Referring to block 912, if the developer selects a single VPA component, the system 100 may automatically offer or select all of the components that are related to the selected component through the ontology 112.

At block 916, the system 100 determines whether any of the selected components need to be customized for the particular domain of interest. To do this, the system 100 may allow the developer to interactively select components to be customized. In some cases, the system 100 may automatically determine that certain components 114 need to be customized based on the hierarchical relationships in the ontology 112 or the fact that the domain of interest is not yet represented in the ontology 112, for example. If no components 114 need to be customized, the system 100 skips block 918.

If one or more of the components needs to be customized, the system 100 creates the customized versions of the components for the domain of interest, as needed, at block 918. To do this, the system may provide a user interface by which the developer can create new VPA components by hand, or create new domain-adapted versions of the components 114 that incorporate data values from the domain knowledge base 116. In some cases, data values from the knowledge base 116 may be automatically merged by the system 100 with the re-usable components 114 that reference the corresponding parameters, based on the data relationships and linkages connecting the elements of the domain knowledge base 116 with the ontology 112 and those connecting the re-usable components 114 with the ontology 112. For example, color, size and style data stored in a portion of the domain knowledge base 116 that includes data values for women's jeans may be automatically linked or merged with VPA components 114 that are connected with the jeans 716 entity of the ontology 710, to create VPA components that are adapted to the jeans domain.

Following block 916 or block 918, as the case may be, the system proceeds to create the VPA application with the domain-adapted re-usable components and any newly created customized components, at block 920. To do this, standard programming mechanisms may be used to compile, assemble and/or link the various components of the VPA 210, as should be understood by those skilled in the art. At block 922, the system 100 updates the VPA developer's toolkit (e.g., the platform 110) to include the new domain-adapted and/or customized VPA components, as needed, so that they may be re-used in future VPA developments.

At block 924, the system 100 determines whether to continue building the VPA application 210 by adding another domain to the VPA. For example, an e-commerce VPA for a department store may need to ultimately include re-usable components for both apparel 714 and electronics 726. The VPA developer may thus choose to develop and test the VPA for one of those domains and then add the other later. In other embodiments, multiple different domains may be added to the VPA application before the functional version of the application is created at block 920. If another domain is to be added to the VPA 210, the system 100 returns to block 910. If no additional domains are to be added to the VPA 210, the system 100 concludes its execution of the method 900.

Referring now to FIG. 10, an illustrative graphical user interface 1000 for the VPA development platform 110 is shown. An interactive display screen 1010 is shown in response to the developer's selection of an e-commerce domain and an intent of "buy product." Columns 1012, 1014, 106 display re-usable VPA components 114 (e.g., NL grammars, task flows, and NL responses) that are linked with the "buy product" intent. All of these components 114 are automatically displayed and selected by virtue of their relationship with the "buy product" intent through the ontology 112. The platform 110 allows the developer to de-select one or more of the displayed components via the graphical user controls 1018, 1020, 1022, or by simply de-selecting individual components displayed in the columns 1012, 1014, 1016. Once the desired components have been selected, the developer may select the "go" control 1024 to proceed with the next step of VPA creation. As with FIGS. 7-8, described above, FIG. 10 represents a highly simplified depiction of a user interface in that there are typically a very large number of NL grammars, task flows, and responses associated with each intent, as well as a large number of intents, associated with a given VPA domain.

Example Usage Scenarios

Embodiments of the VPA development platform 110 and/or portions thereof can be used to accelerate the deployment of VPA applications in domains that have large data sets, such as e-commerce, geographic navigation and surveillance (e.g., maritime or aviation traffic monitoring applications), and/or others. Embodiments of the VPA development platform 110 may be used to facilitate the maintenance and support of VPA applications by automating the process of updating the VPA components as information in the application domain changes. By providing re-usable VPA components, embodiments of the VPA development platform 110 can make it easier to develop new VPA applications or add new domains to an existing VPA application.

For example, in the domain of e-commerce, a developer may be engaged to develop a VPA application for a 'boutique' vendor such as a vendor of high-end jewelry or handbags, or designer clothing. Using an embodiment of the ontology populating agent 118, the developer may quickly obtain a large amount of detailed information about the vendor's products from publicly accessible sources (e.g., Internet web pages), and organize it in a way that can be readily accepted by the components of the VPA application or used to create customized versions of previously-created "default" e-commerce VPA components. When the product information changes, embodiments of the ontology populating agent 118 can be used to update the ontology 112 and thereby facilitate incorporation of the information updates into the VPA components in an automated way.

As another example, a developer may be engaged to create a VPA application for a vendor that sells a large assortment of different types of products, such as a department store or "big box" retailer. In this scenario, the developer may use an embodiment of the VPA development platform 110 to create the VPA application for one of the product types, initially, based on a generalized 'retail product' ontology, and then expand the VPA application to include other product types in future releases.

Implementation Examples

Referring now to FIG. 11, a simplified block diagram of an exemplary hardware environment 1100 for the computing system 100, in which the VPA development platform 110 may be embodied, and/or the computing system 200, in which the VPA application 210 may be embodied, is shown. The illustrative environment 1100 includes a computing device 1110, which may be in communication with one or more other computing devices 1132 via one or more networks 1130. Illustratively, a portion 110A of the VPA development platform 110 and a portion 210A of the VPA 210 are local to the computing device 1110, while other portions 110B, 210B are distributed across one or more of the other computing systems or devices 1132 that are connected to the network(s) 1130.

For example, in some embodiments, portions of the VPA development platform 110 and/or the VPA 210 may be stored locally while other portions thereof are distributed across a network (and likewise for other components of the VPA development platform 110). In some embodiments, however, the VPA development platform 110 and/or the VPA 210 may be located entirely on the computing device 1110. In some embodiments, portions of the VPA development platform 110 and/or the VPA 210 may be incorporated into other systems or interactive software applications. Such applications or systems may include, for example, operating systems, middleware or framework (e.g., application programming interface or API) software, and/or user-level applications software (e.g., another interactive software application, such as a search engine, web browser or web site application, or a user interface for a computing device).

For ease of illustration, FIG. 11 shows both the VPA development platform 110 and the VPA 210 as being coupled to the I/O subsystem 1116. It should be understood, however, that the VPA development platform 110 and the VPA 210 may be located on or connected to the same computing device, or entirely different computing devices. For example, in some embodiments, all or portions of the VPA development platform 110 may reside on a desktop computer, while all or portions of the VPA 210 may be located on a mobile computing device.

The illustrative computing device 1110 includes at least one processor 1112 (e.g. a controller, microprocessor, microcontroller, digital signal processor, etc.), memory 1114, and an input/output (I/O) subsystem 1116. The computing device 1110 may be embodied as any type of computing device such as a personal computer or mobile device (e.g., desktop, laptop, tablet, smart phone, body-mounted device, etc.), a server, an enterprise computer system, a network of computers, a combination of computers and other electronic devices, or other electronic devices. Although not specifically shown, it should be understood that the I/O subsystem 1116 typically includes, among other things, an I/O controller, a memory controller, and one or more I/O ports. The processor 1112 and the I/O subsystem 1116 are communicatively coupled to the memory 1114. The memory 1114 may be embodied as any type of suitable computer memory device (e.g., volatile memory such as various forms of random access memory).

The I/O subsystem 1116 is communicatively coupled to a number of components including one or more user input devices 1118 (e.g., a microphone, a touchscreen, keyboard, virtual keypad, etc.), one or more storage media 1120, one or more output devices 1120 (e.g., audio speakers, displays, LEDs, etc.), one or more sensing devices 1122 (e.g., motion sensors, pressure sensors, kinetic sensors, temperature sensors, biometric sensors, and/or others), and one or more communications interfaces 1124. The storage media 1120 may include one or more hard drives or other suitable persistent data storage devices (e.g., flash memory, memory cards, memory sticks, and/or others). Illustratively, portions of the shareable ontology 112A, the re-usable VPA components 114A and the domain knowledge base 116A reside in the storage media 1120 while other portions 112B, 114B, 116B reside in storage media of the other computing devices 1132. In other embodiments, one or more of these components may reside entirely on the computing device 1110 or on another computing device 1132. In some embodiments, portions of systems software (e.g., an operating system, etc.), framework/middleware (e.g., APIs, object libraries, etc.), the VPA development platform 110, and/or the VPA 210 reside at least temporarily in the storage media 1120. Portions of systems software, framework/middleware, the VPA development platform 110 (including the ontology 112, components 114, and knowledge base 116) and/or the VPA 210 may be copied to the memory 1114 during operation of the computing device 1110, for faster processing or other reasons.

The one or more communications interfaces 1124 may communicatively couple the computing device 1110 to a local area network, wide area network, personal cloud, enterprise cloud, public cloud, and/or the Internet, for example. Accordingly, the network interfaces 1130 may include one or more wired or wireless network interface cards or adapters, for example, as may be needed pursuant to the specifications and/or design of the particular computing system 100, 200. The other computing device(s) 1132 may be embodied as any suitable type of computing system or device such as any of the aforementioned types of devices or other electronic devices or systems. For example, in some embodiments, the other computing devices 1132 may include one or more server computers used to store portions of the shareable ontology 112, the re-usable components 114A, and/or the domain knowledge base 116. The computing system 100 may include other components, sub-components, and devices not illustrated in FIG. 11 for clarity of the description. In general, the components of the computing systems 100, 200 are communicatively coupled as shown in FIG. 11 by electronic signal paths, which may be embodied as any type of wired or wireless signal paths capable of facilitating communication between the respective devices and components.

Additional Examples

According to at least one aspect of this disclosure, a method for populating an ontology with content for use in creating a virtual personal assistant ("VPA") computer application for a domain of interest is provided. The VPA application is executable to determine a likely intended goal of a computing device user based on conversational natural language input of the computing device user, execute a task on behalf of the computing device user, and formulate a likely appropriate system response to the conversational natural language input. The method includes, with a computing system, obtaining the content in an automated fashion from one or more Internet web pages that support electronic interactions with computing device users relating to items in the domain of interest, and analyzing the content using the ontology. The ontology defines a computerized structure for representing knowledge relating to one or more domains. Each domain refers to a category of information and/or activities in relation to which the VPA computer application may conduct a conversational natural language dialog with a computing device user. The method also includes determining a characteristic that the content has in common with at least a portion of the ontology, and defining a data relationship between the content and the ontology based on the common characteristic.

Any of the methods may include accessing a component of the VPA computer application that is linked with the ontology and using the accessed component to recognize the characteristic that the content has in common with the ontology. Any of the methods may include identifying a component of the VPA computer application that is linked with the ontology based on the data relationship between the content and the ontology, and using the identified VPA component to analyze the content. Any of the methods may include formulating the content in accordance with a requirement of a component of the VPA computer application that is linked with the ontology. Any of the methods may include obtaining the content from the one or more Internet web sites periodically in response to one or more triggering events. Any of the methods may include predicting the common characteristic and/or the data relationship using a computerized machine learning model. Any of the methods may include repeating the method for another domain of interest to configure the VPA computer application to operate over multiple domains of interest. Any of the methods may include obtaining the content from a plurality of different Internet web pages. Any of the methods may include presenting an interactive visualization of the ontology on a display of the computing system.

According to at least one aspect of this disclosure, an ontology-populating agent is embodied in one or more machine readable storage media and includes instructions that in response to being executed result in the computing system performing any of the foregoing methods.

According to at least one aspect of this disclosure, a method for creating a virtual personal assistant ("VPA") computer application for a domain of interest is provided. The method includes, with a computing system, determining the domain of interest, and accessing a computerized ontology. The ontology defines a structure for representing knowledge relating to a plurality of domains. Each domain refers to a category of information and/or activities in relation to which the VPA computer application may conduct a conversational natural language dialog with a computing device user. The ontology has linked thereto a plurality of re-usable VPA components. Each of the re-usable VPA components is accessible by an executable VPA engine to determine a likely intended goal of the computing device user based on a determined meaning of conversational natural language input of the computing device user, execute a task on behalf of the computing device user, and/or generate a likely appropriate system output in response to the conversational natural language input. The method also includes determining a data relationship between the domain of interest and at least a portion of the ontology, and suggesting a re-usable VPA component to use to create the VPA computer application for the domain of interest based on the data relationship between the domain of interest and the ontology.

The ontology may include a hierarchical structure of ontological concepts each representing a portion of the knowledge relating to the plurality of domains, where the re-usable VPA component is linked with one of the ontological concepts in the hierarchical structure, the data relationship between the domain of interest and the ontology includes a data relationship between the domain of interest and another of the ontological concepts in the hierarchical structure, and the method includes identifying the re-usable VPA component in an automated fashion based on an inheritance relationship between the one of the ontological concepts and the other of the ontological concepts in the hierarchical structure.

Any of the methods may include creating a customized version of the suggested re-usable VPA component for the domain of interest. Any of the methods may include replacing a parameter of the suggested re-usable VPA component with content associated with the domain of interest. Any of the methods may include updating the ontology to include a link between the ontology and the customized version of the suggested re-usable VPA component. Any of the methods may include suggesting another re-usable VPA component to use to create the VPA computer application for the domain of interest based on the link between the re-usable VPA component and the ontology and a link between the ontology and the other re-usable VPA component. The suggested re-usable VPA component may include a default task flow executable by the VPA computer application in response to the conversational natural language input, and the method may include mapping data from an Internet web page that supports electronic transactions with computing device users relating to the domain of interest to the default task flow using the ontology. The suggested re-usable VPA component may include a natural language dialog component usable by the VPA computer application to determine the likely intended meaning of the conversational natural language input, and the method may include mapping data from an Internet web page that supports electronic transactions with computing device users relating to the domain of interest to the natural language dialog component through the ontology. The suggested re-usable VPA component may include a natural language dialog component usable by the VPA computer application to generate the likely appropriate system output to the conversational natural language input, and the method may include mapping data from an Internet web page that supports electronic transactions with computing device users relating to the domain of interest to the natural language dialog component using the ontology.

General Considerations

In the foregoing description, numerous specific details, examples, and scenarios are set forth in order to provide a more thorough understanding of the present disclosure. It will be appreciated, however, that embodiments of the disclosure may be practiced without such specific details.

Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A method for creating a virtual personal assistant ("VPA") computer application for a domain of interest, the method comprising, with a computing system:
   determining the domain of interest;
   accessing a computerized ontology defining a structure for representing knowledge relating to a plurality of domains including the domain of interest, each domain referring to a category of information and/or activities in relation to which the VPA computer application may conduct a conversational natural language dialog with a computing device user,
   the ontology having linked thereto a plurality of re-usable VPA components, each of the re-usable VPA components being accessible by an executable VPA engine to, during operation of the VPA, determine a likely intended goal of the computing device user based on a determined meaning of explicit and implicit conversational natural language input of the computing device user, execute a task on behalf of the computing device user, and/or generate a likely appropriate system output in response to the conversational natural language input;
   determining a data relationship between the domain of interest and at least a portion of the ontology; and
   suggesting a re-usable VPA component to use to create the VPA computer application for the domain of interest based on the data relationship between the domain of interest and the ontology.

2. The method of claim 1, wherein the ontology comprises an hierarchical structure of ontological concepts each representing a portion of the knowledge relating to the plurality of domains,
   the re-usable VPA component is linked with one of the ontological concepts in the hierarchical structure,
   the data relationship between the domain of interest and the ontology comprises a data relationship between the domain of interest and another of the ontological concepts in the hierarchical structure, and
   the method comprises identifying the re-usable VPA component in an automated fashion based on an inheritance relationship between the one of the ontological concepts and the other of the ontological concepts in the hierarchical structure.

3. The method of claim 1, comprising creating a customized version of the suggested re-usable VPA component for the domain of interest.

4. The method of claim 3, comprising replacing a parameter of the suggested re-usable VPA component with content associated with the domain of interest.

5. The method of claim 3, comprising updating the ontology to include a link between the ontology and the customized version of the suggested re-usable VPA component.

6. The method of claim 1, comprising suggesting another re-usable VPA component to use to create the VPA computer application for the domain of interest based on the link between the re-usable VPA component and the ontology and a link between the ontology and the other re-usable VPA component.

7. The method of claim 1, wherein the suggested re-usable VPA component comprises a default task flow executable by the VPA computer application in response to the conversational natural language input, and the method comprises mapping data from an Internet web page that supports electronic transactions with computing device users relating to the domain of interest to the default task flow using the ontology.

8. The method of claim 1, wherein the suggested re-usable VPA component comprises a natural language dialog component usable by the VPA computer application to determine the likely intended meaning of the conversational natural language input, and the method comprises mapping data from an Internet web page that supports electronic transactions with computing device users relating to the domain of interest to the natural language dialog component through the ontology.

9. The method of claim 1, wherein the suggested re-usable VPA component comprises a natural language dialog component usable by the VPA computer application to generate the likely appropriate system output to the conversational natural language input, and the method comprises mapping data from an Internet web page that supports electronic transactions with computing device users relating to the domain of interest to the natural language dialog component using the ontology.

10. A system for creating a virtual personal assistant ("VPA") computer application for a domain of interest, the system comprising one or more computing devices configured to:
    access a computerized ontology defining a structure for representing knowledge relating to a plurality of domains, each domain referring to a category of information and/or activities in relation to which the VPA computer application may conduct a conversational spoken natural language dialog with a computing device user,
    the ontology having linked thereto a plurality of re-usable VPA components, each of the re-usable VPA components being accessible by an executable VPA engine to, during operation of the VPA, determine a likely intended goal of the computing device user based on a determined meaning of explicit and implicit conversational natural language input of the computing device user, execute a task on behalf of the computing device user, and/or generate a likely appropriate system output in response to the conversational natural language input;
    determine a data relationship between the domain of interest and at least a portion of the ontology; and
    responsive to the determination of the data relationship, suggest a re-usable VPA component to use to create the VPA computer application for the domain of interest based on the data relationship between the domain of interest and the ontology.

11. The system of claim 10, wherein the ontology comprises an hierarchical structure of ontological concepts each representing a portion of the knowledge relating to the plurality of domains,
    the re-usable VPA component is linked with one of the ontological concepts in the hierarchical structure,
    the data relationship between the domain of interest and the ontology comprises a data relationship between the domain of interest and another of the ontological concepts in the hierarchical structure, and
    the system is configured to identify the re-usable VPA component in an automated fashion based on an inheritance relationship between the one of the ontological concepts and the other of the ontological concepts in the hierarchical structure.

12. The system of claim 10, configured to create a customized version of the suggested re-usable VPA component for the domain of interest.

13. The system of claim 10, configured to replace a parameter of the suggested re-usable VPA component with content associated with the domain of interest.

14. The system of claim 10, configured to update the ontology to include a link between the ontology and the customized version of the suggested re-usable VPA component.

15. The system of claim 10, configured to suggest another re-usable VPA component to use to create the VPA computer application for the domain of interest based on the link between the re-usable VPA component and the ontology and a link between the ontology and the other re-usable VPA component.

16. The system of claim 10, wherein the suggested re-usable VPA component comprises a default task flow executable by the VPA computer application in response to the conversational natural language input, and the system is configured to map data from an Internet web page that supports electronic transactions with computing device users relating to the domain of interest to the default task flow using the ontology.

17. The system of claim 10, wherein the suggested re-usable VPA component comprises a natural language dialog component usable by the VPA computer application to determine the likely intended meaning of the conversational natural language input, and the system is configured to map data from an Internet web page that supports electronic transactions with computing device users relating to the domain of interest to the natural language dialog component through the ontology.

18. The system of claim 10, wherein the suggested re-usable VPA component comprises a natural language dialog component usable by the VPA computer application to generate the likely appropriate system output to the conversational natural language input, and the system is configured to map data from an Internet web page that supports electronic transactions with computing device users relating to the domain of interest to the natural language dialog component using the ontology.

19. An application, embodied in one or more non-transitory computer readable storage media, to facilitate creation of a virtual personal assistant ("VPA") computer application for a domain of interest, the application comprising instructions executable by one or more computing devices to:
    access a computerized ontology defining a structure for representing knowledge relating to a plurality of domains, each domain referring to a category of information and/or activities in relation to which the VPA computer application may conduct a conversational spoken natural language dialog with a computing device user,
    the ontology having linked thereto a plurality of re-usable VPA components, each of the re-usable VPA components being accessible by an executable VPA engine to, during operation of the VPA, determine a likely intended goal of the computing device user based on determined meaning of explicit and implicit conversational natural language input of the computing device user, execute a task on behalf of the computing device user, and/or generate a likely appropriate system output in response to the conversational natural language input; and
    based on at least a portion of the ontology, suggest a re-usable VPA component to use to create the VPA computer application for the domain of interest.

20. The application of claim 19, comprising instructions executable by one or more computing devices to cause a domain-specific version of the suggested re-usable VPA component to be incorporated into the VPA computer application for the domain of interest.

* * * * *